United States Patent
Ahn et al.

(10) Patent No.: US 9,460,682 B2
(45) Date of Patent: Oct. 4, 2016

(54) METHOD OF DRIVING A DISPLAY DEVICE

(71) Applicant: Samsung Display Co., LTD., Yongin, Gyeonggi-Do (KR)

(72) Inventors: Ik-Hyun Ahn, Hwaseong-si (KR); Bong-Im Park, Asan-si (KR); Seon-Ki Kim, Anyang-si (KR); Se-Huhn Hur, Yongin-si (KR)

(73) Assignee: Samsung Display Co., Ltd. (KR)

( * ) Notice: Subject to any disclaimer, the term of this patent is extended or adjusted under 35 U.S.C. 154(b) by 509 days.

(21) Appl. No.: 13/856,280

(22) Filed: Apr. 3, 2013

(65) Prior Publication Data

US 2013/0271441 A1 Oct. 17, 2013

(30) Foreign Application Priority Data

Apr. 16, 2012 (KR) .................. 10-2012-0039317

(51) Int. Cl.
*G09G 3/36* (2006.01)
*G09G 3/00* (2006.01)

(52) U.S. Cl.
CPC ............ *G09G 3/3696* (2013.01); *G09G 3/003* (2013.01); *G09G 3/3648* (2013.01); *G09G 2310/024* (2013.01); *G09G 2310/0205* (2013.01); *G09G 2310/0218* (2013.01); *G09G 2310/0224* (2013.01); *G09G 2310/0227* (2013.01); *G09G 2310/0237* (2013.01); *G09G 2310/0251* (2013.01); *G09G 2320/0261* (2013.01)

(58) Field of Classification Search
CPC ............ G09G 2310/0237; G09G 2310/0251; G09G 2310/0224; G09G 2310/0227; G09G 3/3696; G09G 3/003; G09G 3/3648; G09G 2310/0218
USPC ......... 345/87–88, 690–691, 204; 348/51, 54, 348/56, E13.075, E13.001, E13.059
See application file for complete search history.

(56) References Cited

U.S. PATENT DOCUMENTS

| 8,988,510 | B2 | 3/2015 | Min et al. |
| 9,077,985 | B2 | 7/2015 | Nakahata et al. |
| 2003/0179221 | A1 | 9/2003 | Nitta et al. |
| 2004/0041760 | A1* | 3/2004 | Tsumura ................ G09G 3/342 345/87 |
| 2010/0020110 | A1* | 1/2010 | Yamato ................ G09G 3/3648 345/690 |
| 2012/0033053 | A1* | 2/2012 | Park .................. H04N 13/0438 348/51 |
| 2012/0147069 | A1 | 6/2012 | Chen et al. |

FOREIGN PATENT DOCUMENTS

| CN | 101945298 A | 1/2011 |
| CN | 101604511 B | 6/2011 |
| CN | 102103839 A | 6/2011 |
| KR | 1020080073431 A | 8/2008 |
| WO | 2007/021457 | 2/2007 |

OTHER PUBLICATIONS

European Search Report corresponding to European Patent Application No. 13163381.0, Nov. 22, 2013, 10 pages.

* cited by examiner

*Primary Examiner* — Jennifer Nguyen
(74) *Attorney, Agent, or Firm* — Innovation Counsel LLP

(57) ABSTRACT

A method of driving a display device includes a preliminary frame charging step and a main frame charging step. The method comprises a preliminary frame charging step of simultaneously charging liquid crystal cells in a pixel line group having a selected pixel row and a unselected pixel row with pixel data of the selected pixel row of the pixel line group and a main frame charging step of charging liquid crystal cells in the unselected pixel line group with pixel data of the unselected pixel line group.

27 Claims, 21 Drawing Sheets

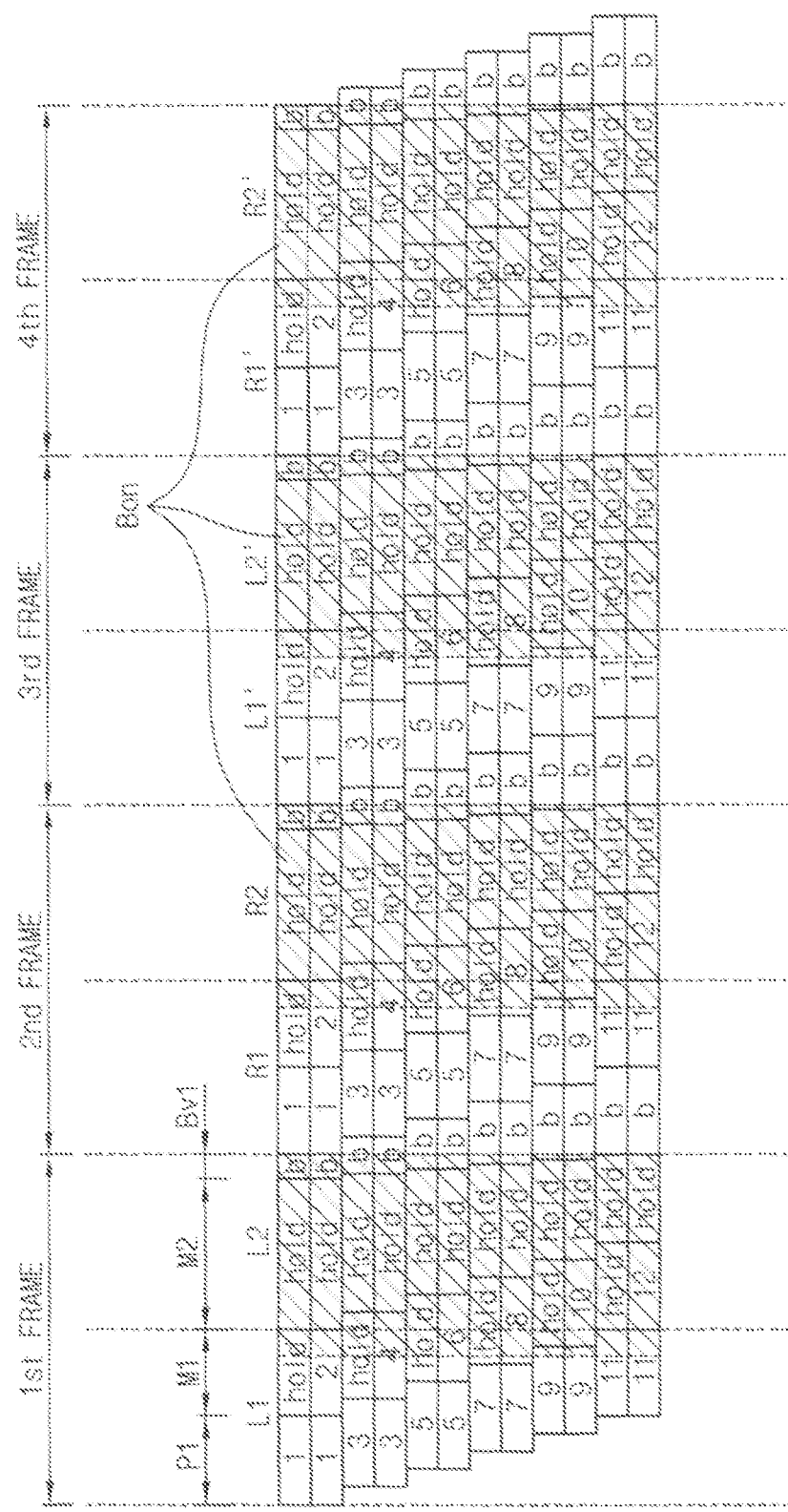

METHOD OF DRIVING A DISPLAY DEVICE

CROSS-REFERENCE TO RELATED APPLICATIONS

This application claims priority under 35 U.S.C. §119 to Korean Patent Application No. 10-2012-0039317, filed on Apr. 16, 2012 in the Korean Intellectual Property Office (KIPO), the contents of which are herein incorporated by reference in their entirety.

BACKGROUND OF THE INVENTION

1. Technical Field

Exemplary embodiments of the present invention relate to a method of driving a display device. More particularly, exemplary embodiments of the present invention relate to a method of driving a display device for reducing a frame scanning delay.

2. Discussion of the Related Art

A liquid crystal display device displays images by controlling a light transmittance using liquid crystals which change transmittance of light according to a voltage applied to the liquid crystal. A liquid crystal display device includes a liquid crystal display panel displaying images and a backlight unit providing light to the liquid crystal display panel. The liquid crystal display panel includes liquid crystal cells corresponding to each pixel. Each of the liquid crystal cells alters light transmittance in accordance with an electric field applied to the liquid crystal cells, and transmits light provided from the backlight unit to display an image.

Each of the liquid crystal cells is applied a predetermined voltage in order to alter light transmittance corresponding to an image to be displayed. A predetermined time is required for rearrangement of liquid crystals in order to have a desired transmittance by applying a voltage to each liquid crystal cells. The time required to rearrange the liquid crystal is referred as to a charging time. A backlight unit provides light to liquid crystal cells after the charging time of the liquid crystal cells is elapsed.

A time between a charging start time of the first pixel row and a charging start time of the last pixel row when pixel rows are scanned sequentially is a standard charging time of liquid crystal panel. Thus, a time required to prepare for displaying an image is same to a standard charging time of the liquid crystals. In a conventional liquid display device, the standard charging time of liquid crystal is long and the backlight unit can only provide light during a limited time, so that a brightness of a display is reduced.

When displaying a 3D image, a left-eye image and a right-eye image are alternatingly displayed on a display device. As a result, it is impossible to guarantee enough time to charge the liquid crystal when the standard charging time is too long. Thus, it is inevitable to reduce a vertical resolution of a display by half to secure a charging time of the liquid crystals.

SUMMARY

Exemplary embodiments of the present invention provide a method of driving a display device capable of reducing a frame scanning delay time within a limited response time.

According to one aspect of the present invention, a method of driving a display device may include a preliminary frame charging step of simultaneously charging liquid crystal cells in a pixel line group having a selected pixel row and a unselected pixel row with pixel data of the selected pixel row of the pixel line group; and a main frame charging step of charging liquid crystal cells in the unselected pixel line group with pixel data of the unselected pixel line group.

In an exemplary embodiment, the pixel line group may have n pixel lines and the main frame charging step is repeated (n−1) times during one frame, wherein n is natural numbers greater than 2.

In an exemplary embodiment, the preliminary frame charging step and the main frame charging step may be performed during a time shorter than 1/n of a standard charging time of the liquid crystal cells.

In an exemplary embodiment, in the preliminary frame charging step and the main frame charging step, wherein a difference between a charging start time of the first pixel line and a charging start time of the last pixel line is a half of a standard charging time of the liquid crystal cells.

In an exemplary embodiment, a backlight may be turned on during the main frame charging step.

In an exemplary embodiment, the preliminary frame charging step and the main frame charging step may be performed for a standard charging time of the liquid crystal cells.

In an exemplary embodiment, when a backlight unit is sequentially driven corresponding to rows of pixels, the backlight unit may be turned on after a half of a standard charging time of the liquid crystal cell is elapsed from a beginning of the preliminary frame charging step and is turned off before an ending of the main frame charging step.

In an exemplary embodiment, when the backlight unit is simultaneously turned on, the backlight unit may be turned on after beginning of a preliminary frame charging step of the first pixel line and before ending of a main frame maintaining step of the first pixel line.

In an exemplary embodiment, the preliminary frame charging step and the main frame charging step may be performed for a half of a standard charging time of the liquid crystal cells.

In an exemplary embodiment, when a backlight unit is sequentially driven corresponding to rows of pixels, the backlight unit may be turned on after a beginning of the main charging step and is turned off before an ending of the main frame charging step.

In an exemplary embodiment, the method may further include a frame maintaining step of maintaining a voltage of liquid crystal cells of all pixel rows.

In an exemplary embodiment, the frame maintaining step may be performed for a standard charging time of the liquid crystal cells.

In an exemplary embodiment, when the backlight unit is turned on simultaneously, the backlight unit may be turned on after an ending a main frame charging step of the last pixel line and before an ending of a frame maintaining step of the first pixel line.

In an exemplary embodiment, the method may further include a black image step of charging a voltage corresponding to a black image into liquid crystal cells of all pixel rows.

In an exemplary embodiment, the frame maintaining step and the black image step may be performed for a half of the standard charging time of each liquid crystal cells.

In an exemplary embodiment, the duration of the black image step may be set to have a maximum duration at the last pixel line by being gradually increased from the first pixel row.

In an exemplary embodiment, the method may further include a reversion preliminary frame charging step and a reversion main frame charging step. The reversion preliminary frame charging step is to simultaneously charge a pixel data of the unselected pixel row to the liquid crystal cells of the selected pixel row and the unselected pixel row in the preliminary frame charging step, after the preliminary charging step and the main frame charging step. The reversion main frame charging step is to maintain a pixel data of liquid crystal cells of the unselected pixel row in the previous frame charge step and simultaneously charging a pixel data of a selected pixel row in the previous frame charge step with a present frame pixel data.

In an exemplary embodiment, images of the preliminary frame charge step, the main frame charge step, the reversion preliminary frame charge step and the reversion main frame charge step may be right-eye images. The method may further includes a preliminary frame charging step of simultaneously charging the liquid crystal cells in the pixel line group having the selected pixel row and the unselected pixel row with left-eye pixel data of the selected pixel row of the pixel line group and a main frame charging step of charging the liquid crystal cells in the unselected pixel line group with left-eye pixel data of the unselected pixel line group.

In an exemplary embodiment, a left-eye image and a right-eye image may be alternatingly displayed on a display device.

In an exemplary embodiment, the method may further include a frame maintaining step of maintaining a voltage of liquid crystal cells of all pixel rows.

In an exemplary embodiment, the total time of the preliminary frame charging step, the main frame charging step and the frame maintaining step may be substantially equal to a standard charging time of the liquid crystal cells.

In an exemplary embodiment, the preliminary frame charging step may include a first preliminary frame charging step and a second preliminary frame charging step. The first preliminary frame charging step is to simultaneously charge a pixel data of a first representative pixel row among a (3N−2)-th pixel row, a (3N−1)-th pixel row and a 3N-th pixel row into liquid crystal cells corresponding to the (3N−2)-th pixel row, the (3N−1)-th pixel row and the 3N-th pixel row, respectively. The second preliminary frame charging step is to maintain a voltage of liquid crystal cells corresponding to the first representative pixel row, to select a second representative line of pixel rows except the first representative pixel row from the (3N−2)-th pixel row, the (3N−1)-th pixel row and the 3N-th pixel row, and to simultaneously charge a pixel data of the second representative pixel row into liquid crystal cells corresponding to remaining two pixel rows.

In an exemplary embodiment, in the first and second preliminary frame charging steps, the main frame charging step and the frame maintaining step, the a difference between a charging start time of the first pixel row and a charging start time of the last pixel row or a difference between a maintaining start time of the first pixel row and a maintaining start time of the last pixel row may be a quarter of a standard charging time of the liquid crystal cells.

In an exemplary embodiment, the first and the second preliminary frame charging steps, the main frame charging step and the frame maintaining step may be performed for a quarter of a standard charging time of the liquid crystal cells.

In an exemplary embodiment, the first and the second preliminary frame charging steps, the main frame charging step and the frame maintaining step may be performed for no less than about ⅓ of a standard charging time of the liquid crystal cells.

In an exemplary embodiment, in the preliminary frame charging step, the main frame charging step and the frame maintaining step, the a difference between a charging start time of the first pixel row and a charging start time of the last pixel row or a difference between a maintaining start time of the first pixel row and a maintaining start time of the last pixel row may be a quarter of a standard charging time of the liquid crystal cells.

In an exemplary embodiment, the preliminary frame charging step and the main frame charging step may be performed during a quarter of a standard charging time of the liquid crystal cells, and the frame maintaining step may be performed during a half of the standard charging time of the liquid crystal cells.

According to another aspect of the present invention, a method of driving a display device may include a preliminary frame charging step of simultaneously charging liquid crystal cells in a pixel line group having a selected pixel row and a unselected pixel row with pixel data of the selected pixel row of the pixel line group; a main frame charging step of charging liquid crystal cells in the unselected pixel line group with pixel data of the unselected pixel line group; a frame maintaining step of maintaining pixel data of liquid crystal cells of all pixel rows; and a black image step of charging a voltage corresponding to a black image into liquid crystal cells of all pixel rows. In this case, the preliminary frame charging step and the main frame charging step may be performed for a half of a standard charging time of the liquid crystal cells. In the black image step, a duration of the black image step corresponding to a first pixel line on a display device may be shorter than that of the black image step corresponding to the last pixel line on the display device.

According to another aspect of the present invention, a method of driving a display device includes a frame charge-maintaining step and a frame maintaining step. The frame charge-maintaining step is to charge a corresponding pixel data into one pixel row selected from a pixel row group including n pixel rows, and of maintaining a voltage of liquid crystal cells of another pixel row. The frame maintaining step is to maintain a voltage of liquid crystal cells of all pixel rows.

In an exemplary embodiment, the frame charge-maintaining step may be repeated in n times per one frame.

According to another aspect of the present invention, a method of driving a display device includes a frame black-charge-maintaining step and a frame maintaining step. The frame black-charge-maintaining step is to charge a corresponding pixel data into one pixel row selected from a pixel row group including n pixel rows, to maintain a voltage of charged liquid crystal cells among liquid crystal cells of another pixel row, and to charge a voltage corresponding to a black image into not charged liquid crystal cells among liquid crystal cells of another pixel row. The frame maintaining step is to maintain a voltage of liquid crystal cells of all pixel rows.

In an exemplary embodiment, the frame black-charge-maintaining step may be repeated in n times per one frame.

According to some exemplary embodiments of the present invention, at least two pixel rows are simultaneously charged to decrease a delay time of pixel row which is generated per one frame in a half or a quarter of a standard charging time of liquid crystals, so that a 3D image may be displayed without decreasing of a vertical resolution.

Moreover, an effective charging interval that a charging of the liquid crystal cells is completed in each frame is longer than a conventional art, so that a light providing time of a backlight unit may be longer. Thus, it may enhance a total luminance of a screen.

Moreover, an effective charging interval that a charging of the liquid crystal cells is completed in each frame is longer, so that a backlight unit driven in a batch may be used instead of a backlight unit sequentially driven so that a manufacturing cost thereof may be markedly reduced.

BRIEF DESCRIPTION OF THE DRAWINGS

The above and other features and aspects of the present invention will become more apparent by describing in detailed exemplary embodiments thereof with reference to the accompanying drawings, in which:

FIG. 21 is a concept diagram schematically showing a driving method of a display device according to another exemplary embodiment of the present invention.

DETAILED DESCRIPTION OF THE INVENTION

Hereinafter, exemplary embodiments of the present invention will be explained in detail with reference to the accompanying drawings.

Figure 1:
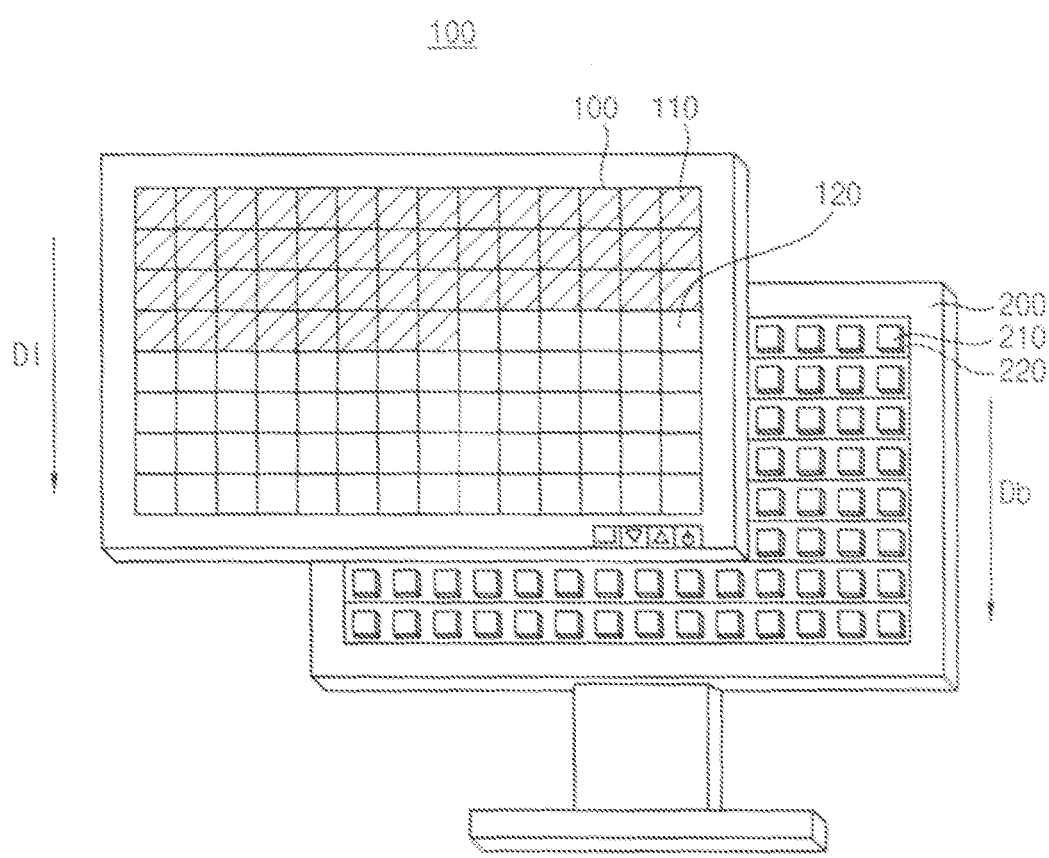
FIG. 1 is a perspective view schematically explaining an operation that a image is displayed in a display device.

FIG. 1 is a perspective view schematically explaining an operation of a display device.

Referring to FIG. 1, a display device includes a liquid crystal display panel 100 and a backlight unit 200. The liquid crystal display panel 100 includes a plurality of liquid crystal cells 110 and 120. The backlight unit 200 includes a plurality of light source substrate 220 and a plurality of light sources 210 formed on the light source substrate 220. The light sources 210 in FIG. 1 are light-emitting diodes (LED). The light sources 210 may be an electro luminescence (EL), a cold cathode fluorescent lamp (CCFL), a hot cathode fluorescent lamp (HCFL), an external electrode fluorescent lamp (EEFL), etc.

In order to display an image on the liquid crystal panel 100, voltages according to each image pixel are applied to the liquid crystal cells 110 and 120. Then light is provided to the liquid crystal cells 110 and 120 by a light source 210 of a backlight unit 200. An electric field on the liquid crystal cells 110 and 120 is applied according to a scan direction D1 pixel rows. The scan direction D1 may be a direction from an upper portion of the liquid crystal panel 100 to a lower portion of the liquid crystal panel 100. Alternatively, the scan direction D1 may be altered in accordance with a driving method of a display device. The liquid crystals in the liquid crystal cells 110 and 120 are rearranged according to an image. In FIG. 1, the liquid crystal cell that a rearrangement of liquid crystal is completed is represented by reference numeral "110", and the liquid crystal cell that a rearrangement of liquid crystal is not completed is represented by reference numeral "120". The liquid crystal cell 120 that a rearrangement of liquid crystal is not completed may have an arrangement of liquid crystals of a previous frame.

After a rearrangement of the liquid crystals is completed in the liquid crystal cells 110 and 120, the light source 220 of the backlight unit 200 is driven to provide the liquid crystal cells 110 and 120 with light. The backlight unit 200 may be individually driven in each area to sequentially provide light to the liquid crystal cell 110 that the rearrangement of the liquid crystals is completed. Alternatively, the backlight unit 200 may be driven simultaneously to provide the liquid crystal cells 110 and 120 with light. When the backlight unit 200 is individually driven in each area, the light source 220 may be sequentially driven along a backlight driving direction Db substantially identical to the scan direction D1 of the liquid crystal cells 110 and 120.

Figure 2:
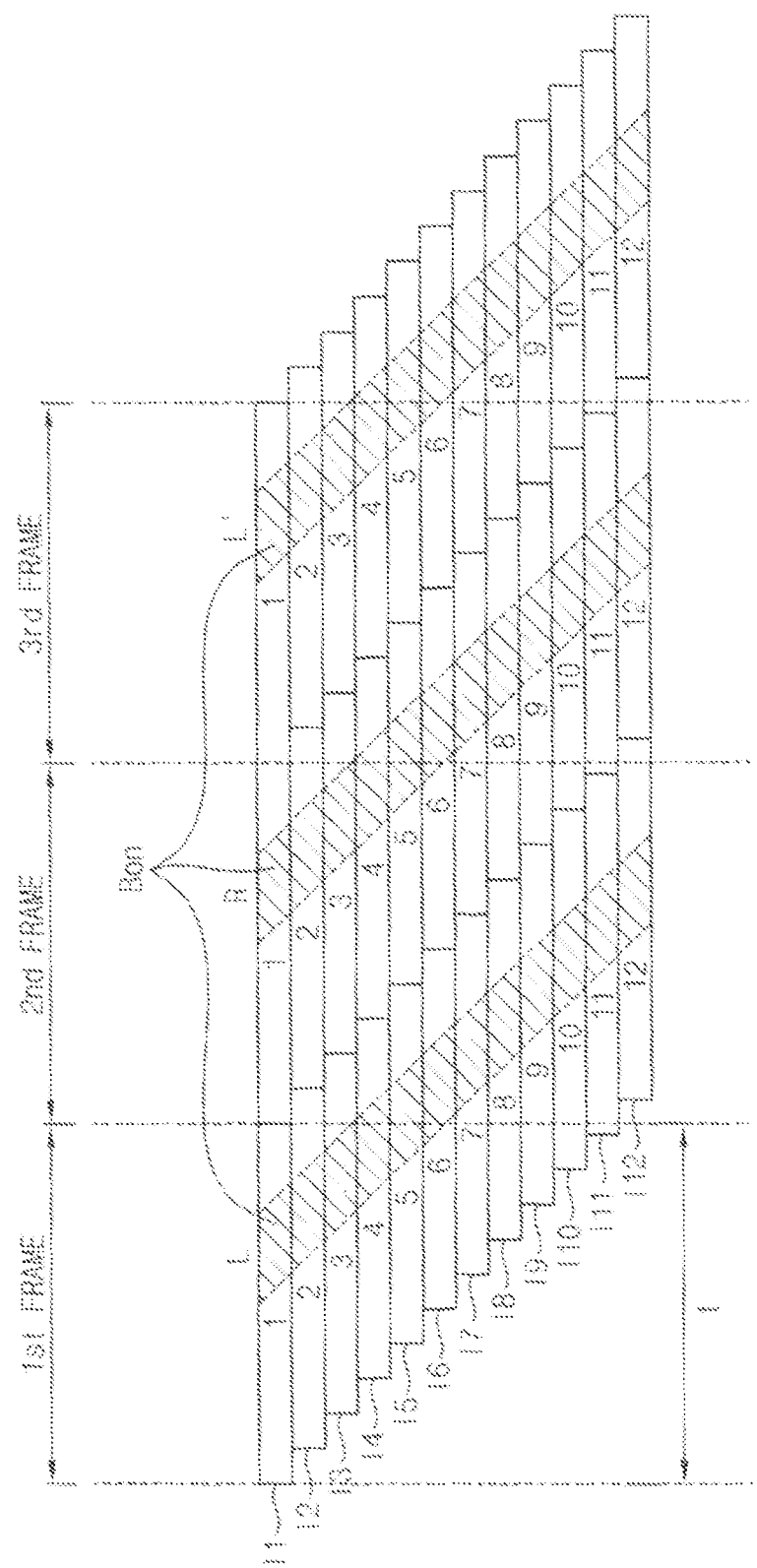
FIG. 2 is a concept diagram schematically showing a scanning type in accordance with a first comparative embodiment.

FIG. 2 is a concept diagram schematically showing a scanning type in accordance with a first comparative embodiment. In FIG. 2, for convenience of description, it is assumed that display device has twelve pixel rows. Generally, display device has more than one thousand pixel rows to display a high quality image.

Referring to FIG. 2, in order to display one frame, twelve pixel rows I1, I2, I3 . . . , I10, I11 and I12 are displayed. Each of the pixel rows I1, I2, I3, . . . , I10, I11 and I12 partially displays an image corresponding to the pixel rows during each of the frame intervals, and displays an image corresponding to next frame when the one frame is ended. In FIG. 2, a left eye image L and a right eye image R are sequentially displayed on a display in an alternating manner. Each of the pixel rows I1, I2, I3, . . . , I10, I11 and I12 is sequentially driven. One frame interval period is a time between a charging start time of the first pixel row and a charging start time of the last pixel row. Moreover, the one frame interval period is substantially equal to a standard charging time t of the liquid crystal cell. The standard charging time t of the liquid crystal cell is time required to finish rearrangement of the liquid crystals after applying a voltage to the liquid crystals. Light should be provided to the liquid crystal cells after charging of the pixel rows I1, I2, I3, . . . , I10, I11 and I12 is sufficiently completed within the one frame interval period. Thus, a backlight unit provides light to the liquid crystal cells at the latter part of the one frame interval period. An interval that the backlight unit provides light is a light providing interval Bon.

Figure 3:
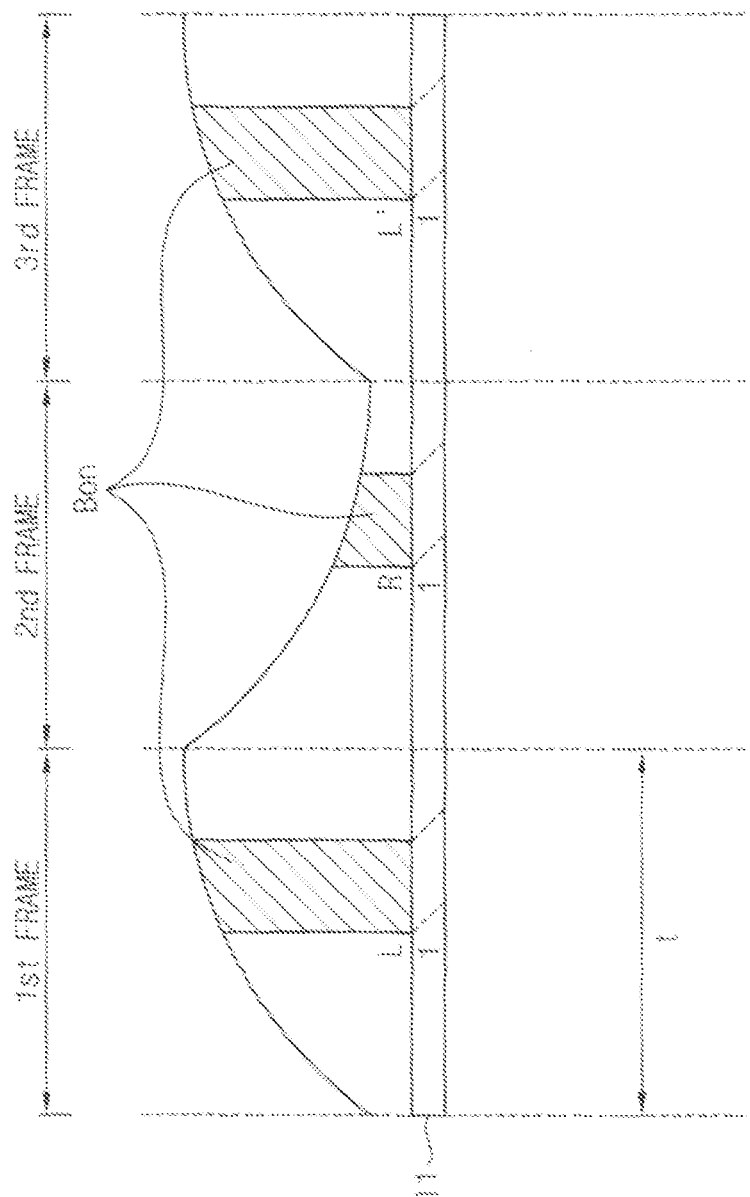
FIG. 3 is a graph showing a charging of liquid crystals in a scanning type of FIG. 2.

FIG. 3 is a graph showing a charging of liquid crystals in a scanning method of FIG. 2.

Generally, liquid crystals are not immediately rearranged in accordance with an electric field but require a predetermined time for rearrangement of the liquid crystals. After a predetermined time period, pixels in the first pixel row I1 is charged and an effective charging status is archived. Light should be provided from a backlight unit after an effective charging status is achieved so that a desired image may be displayed on the display device.

In FIG. 3, the light is provided to the liquid crystal cells after a predetermined time has passed after a charging of the first pixel row I1 for a left eye image L is started and the light is provided to the liquid crystal cells after a predetermined time has passed after a charging of the first pixel row I1 for a right eye image R is started. By repeating the processes, a 3D image may be displayed on a liquid crystal display device.

Figure 4:
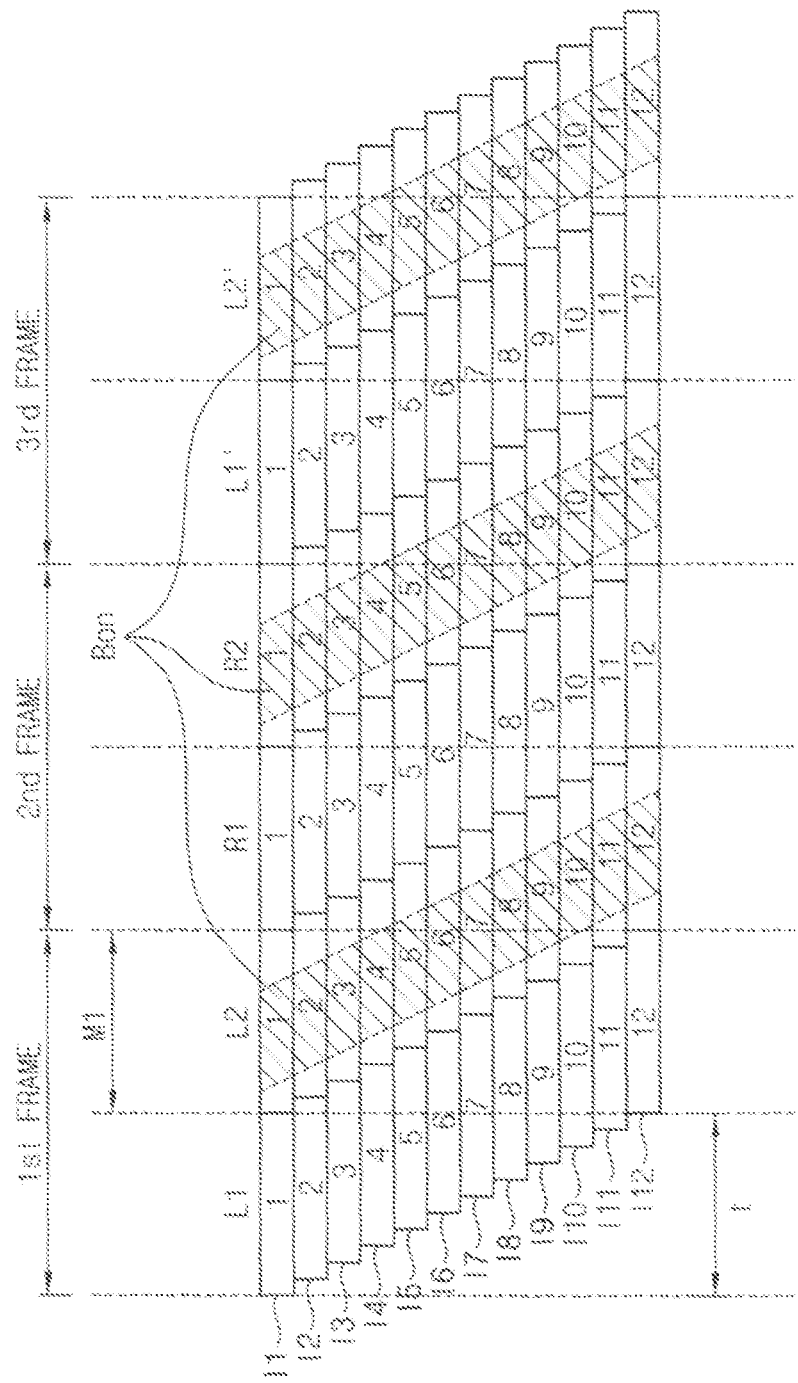
FIG. 4 is a concept diagram schematically showing a scanning type in accordance with a second comparative embodiment.

FIG. 4 is a concept diagram schematically showing a scanning type in accordance with a second comparative embodiment. In FIG. 4, for convenience of description, it is assumed that display device has twelve pixel rows.

Referring to FIG. 4, in order to display one frame, twelve pixel rows I1, I2, I3 . . . , I10, I11 and I12 are displayed. Each of the pixel rows I1, I2, I3, . . . , I10, I11 and I12 partially displays an image corresponding to the rows during each of the frame intervals and displays an image corresponding to next frame when the one frame is ended. In FIG. 4, a left eye image L and a right eye image R are sequentially displayed on a display in an alternating manner. Each of the pixel rows I1, I2, I3, . . . , I10, I11 and I12 is sequentially driven. One frame interval period is a time between a charging start time of the first pixel row and a charging start time of the last pixel row. Moreover, the one frame interval period, 1st FRAME, 2nd FRAME and 3rd FRAME, is substantially equal to two times of a charging time t of the liquid crystal cell. Light should be provided to the liquid crystal cells after charging of the liquid crystals in the pixel rows I1, I2, I3, . . . , I10, I11 and I12 is sufficiently completed within the one frame interval period. Unlike FIG. 2, the present exemplary embodiment has two charging time t in one frame interval period. Thus, a backlight unit provides light at the latter of the one frame interval period, per each pixel row. An interval that the backlight unit provides light is a light providing interval Bon.

Figure 5:
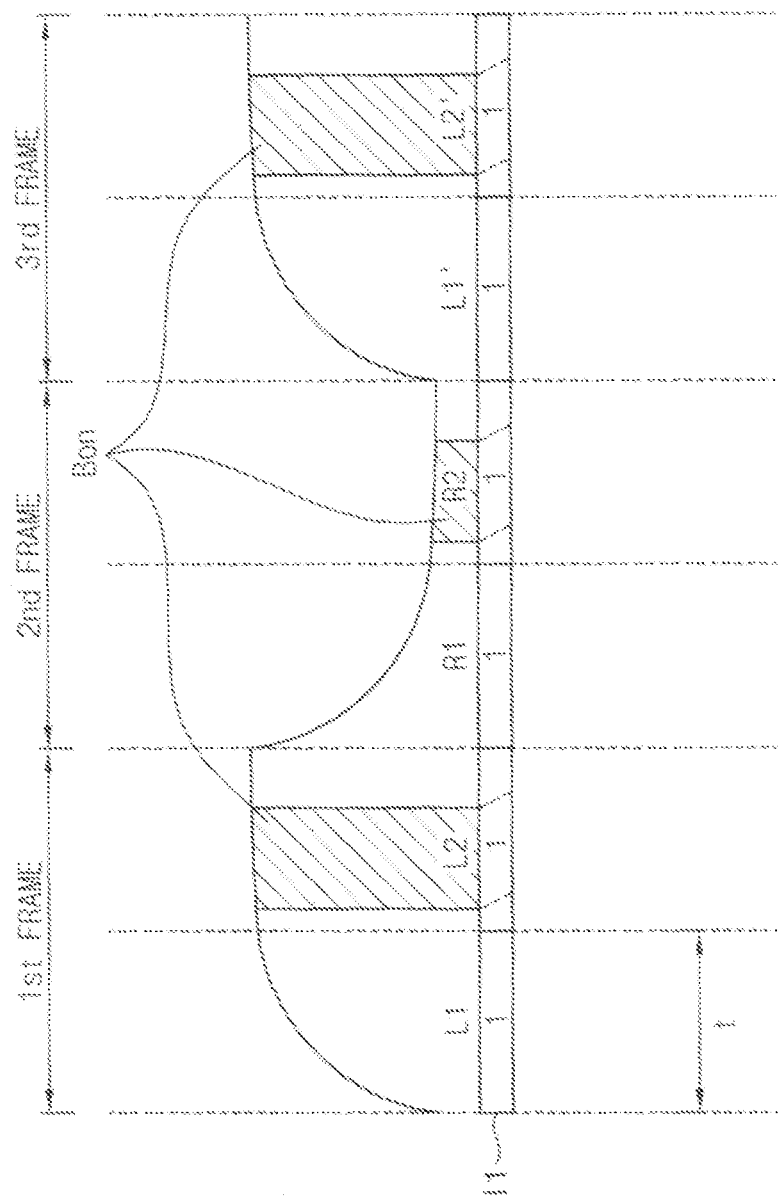
FIG. 5 is a graph showing a charging of liquid crystals in a scanning type of FIG. 4.

FIG. 5 is a graph showing a charging of liquid crystals in a scanning type of FIG. 4.

Generally, liquid crystals are not immediately rearranged in accordance with an electric field but require a predetermined time for rearranging the liquid crystals. In FIG. 5, the charging time 't' is half of the first frame interval period, 1st FRAME. Thus, when a backlight unit provides light during the second charging time 't', a desired image may be displayed on the display.

In FIG. 5, the light is provided from the backlight unit after a charging of the first pixel row I1 for a left eye image L is completed because the light is provided from the backlight unit during a second charging interval. The liquid crystal cell in this embodiment has a twice faster charging time than the liquid crystal cell in an embodiment of FIG. 2. Charging statuses of all the liquid crystal cells are in an effective charging status during the second charging interval, so that much correct image can be displayed. Further, the light is provided from the backlight unit after a charging of the first pixel row I1 for a right eye image R is completed, because the light is provided from the backlight unit during a second charging interval. By repeating the processes, a 3D image may be displayed on a liquid crystal display device.

Figure 6:
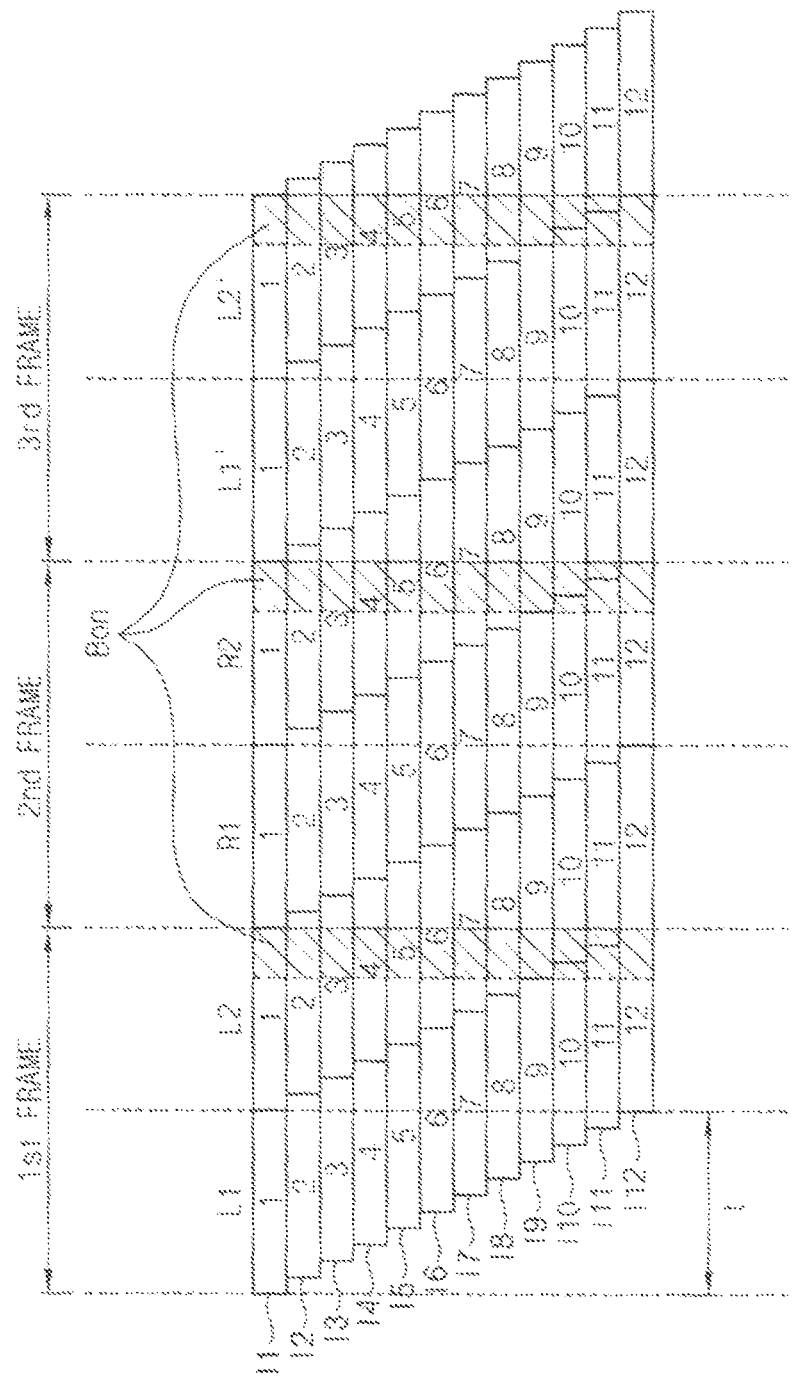
FIG. 6 is a concept diagram schematically showing a scanning type in accordance with a third comparative embodiment.

FIG. 6 is a concept diagram schematically showing a scanning type in accordance with a third comparative embodiment.

The scanning type of FIG. 6 is substantially the same as the scanning type of FIG. 4 except for at least a driving time of a backlight unit. Thus, any repetitive detailed description may hereinafter be omitted. Referring to FIG. 6, each pixel rows I1, I2, I3, . . . , I10, I11 and I12 is sequentially driven, so that each pixel rows I1, I2, I3, . . . , I10, I11 and I12 are charged twice during each one frame interval period, 1st FRAME, 2nd FRAME and 3rd FRAME. Moreover, the each one frame interval period, 1st FRAME, 2nd FRAME and 3rd FRAME, is substantially twice of a charging time t of the liquid crystal cell. Light should be provided in a stage that a charging of the pixel rows I1, I2, I3, . . . , I10, I11 and I12 is sufficiently completed within the one frame interval period, 1st FRAME, 2nd FRAME and 3rd FRAME. Unlike FIG. 2, one frame interval period, 1st FRAME, 2nd FRAME and 3rd FRAME, is twice longer than the charging time t of the liquid crystal in the present exemplary embodiment.

According to the present exemplary embodiment of FIG. 6, a backlight unit is driven simultaneously for all pixel rows. The backlight unit is turned on at the latter part of the first charging time of the twelfth pixel row I12, and turned off before second charging time of the first pixel row I1 is ended.

Figure 7:
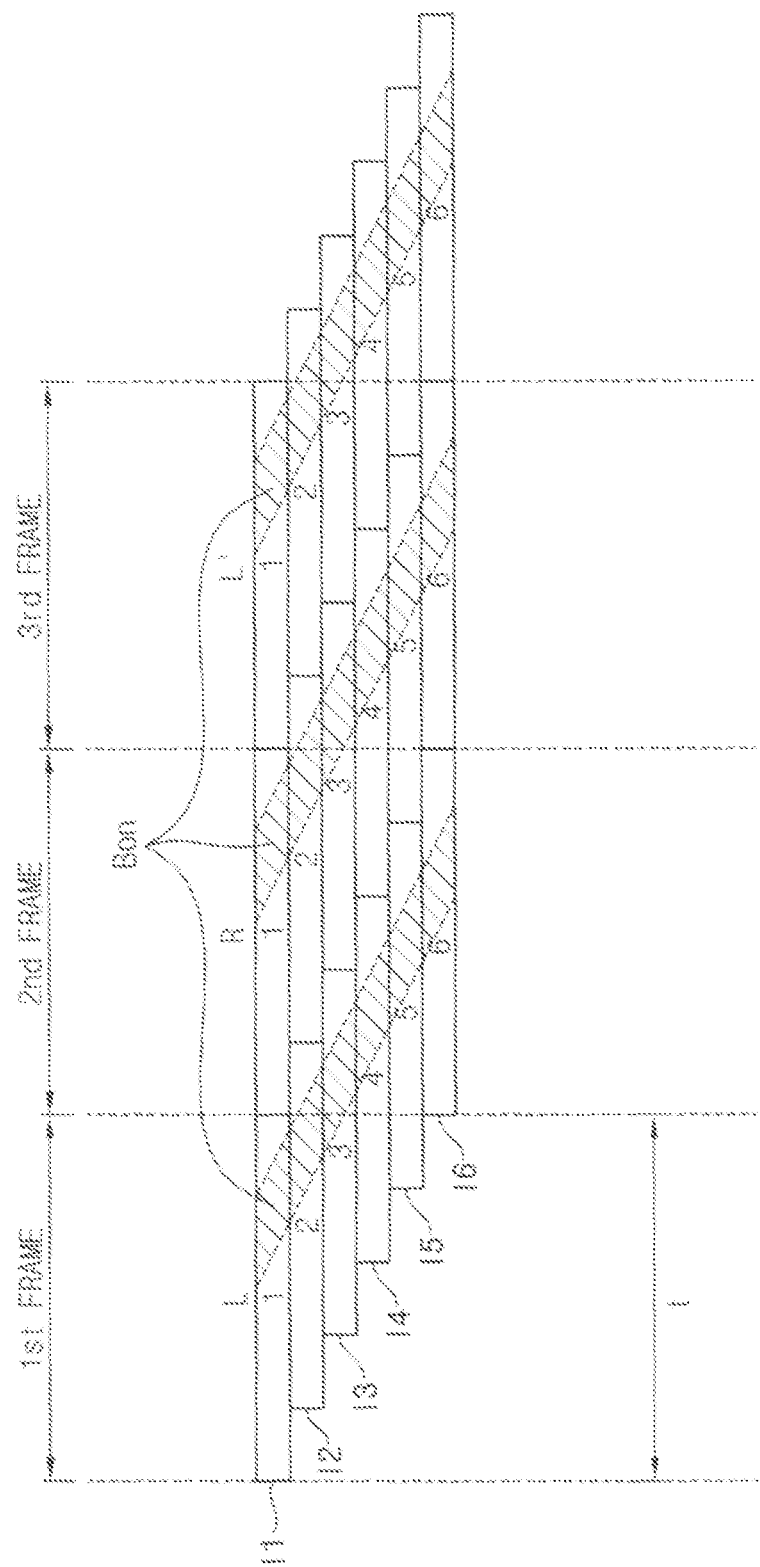
FIG. 7 is a concept diagram schematically showing a scanning type in accordance with a fourth comparative embodiment.

FIG. 7 is a concept diagram schematically showing a scanning type in accordance with a fourth comparative embodiment.

In FIG. 7, it is assumed that display device has six pixel rows. The reason that the number of pixel rows according to a fourth comparative embodiment is different from the number of pixel rows is that a frequency of liquid crystal display according to a fourth comparative embodiment is lower than that of liquid crystal display according to another comparative embodiment.

Referring to FIG. 7, in order to display one frame, 1st FRAME, 2nd FRAME and 3rd FRAME, six pixel rows I1, I2, I3, I4, I5 and I6 are displayed. Each of the pixel rows I1, I2, I3, I4, I5 and I6 partially displays an image corresponding to the pixel rows during each of the one frame interval period, 1st FRAME, 2nd FRAME and 3rd FRAME, and displays an image corresponding to next frame when the one frame interval period, 1st FRAME, 2nd FRAME and 3rd FRAME, is ended. In FIG. 7, a left eye image L and a right eye image R are sequentially displayed on a display in an alternating manner. Each of the pixel rows I1, I2, I3, I4, I5 and I6 is sequentially driven. One frame interval period is a time between a charging start time of the first pixel row and a charging start time of the last pixel row. Moreover, the one frame interval period, 1st FRAME, 2nd FRAME and 3rd FRAME, is substantially equal to a standard charging time t of the liquid crystal cell. Light should be provided to the liquid crystal cells after charging of the pixel rows I1, I2, I3, I4, I5 and I6 is sufficiently completed within the each one frame interval period, 1st FRAME, 2nd FRAME and 3rd FRAME. Thus, a backlight unit is turn on at the latter part of the each one frame interval period, 1st FRAME, 2nd FRAME and 3rd FRAME, per each pixel rows. An interval that the backlight unit provides light is a light providing interval Bon.

Figure 8:
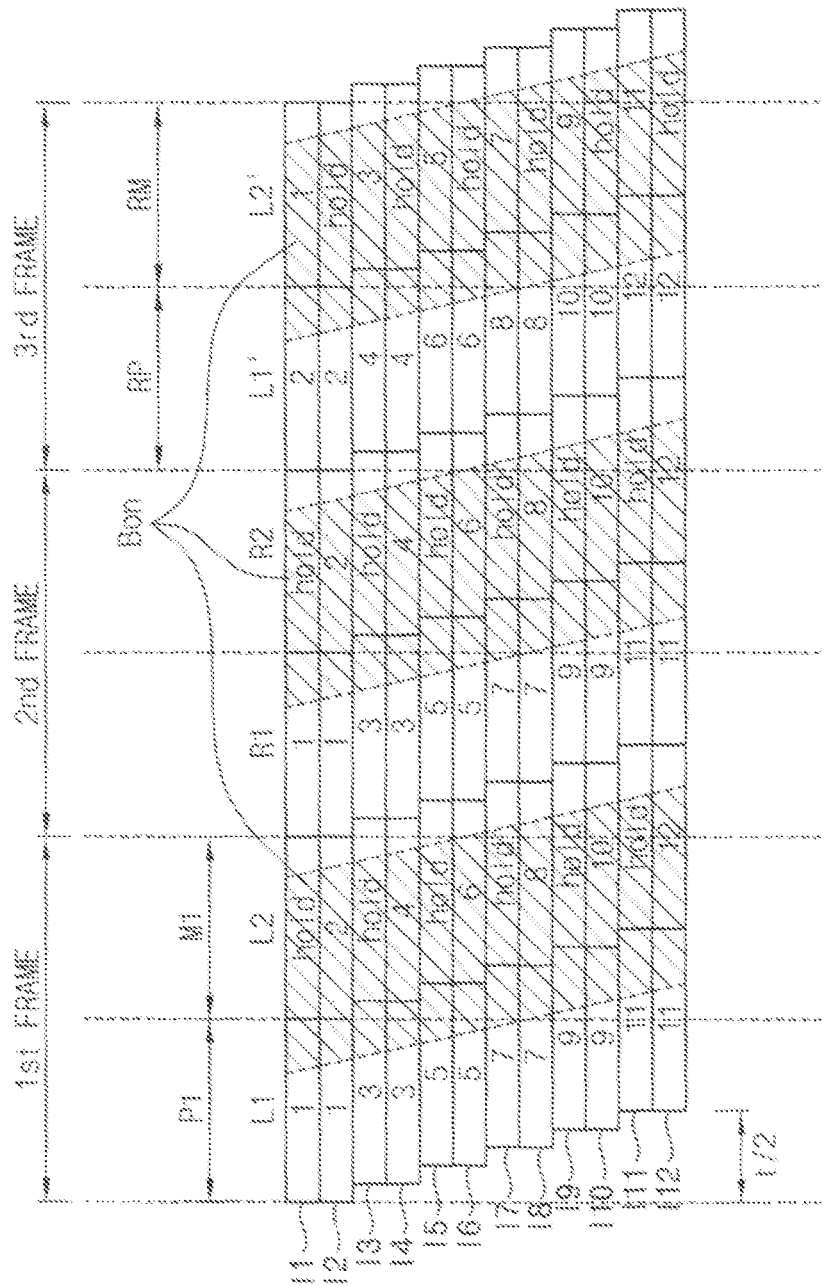
FIG. 8 is a concept diagram schematically showing a driving method of a display device according to one exemplary embodiment of the present invention.

FIG. 8 is a concept diagram schematically showing a driving method of a display device according to one exemplary embodiment of the present invention.

Referring to FIG. 8, a driving method of a display device includes a preliminary frame charging step P1 and a main frame charging step M1. In FIG. 8, for convenience of description, it is assumed that display device has twelve pixel rows. Generally, display device has more than one thousand pixel rows to display a high quality image.

In a driving method of a display apparatus according to the present exemplary embodiment, a first frame 1st FRAME, a second frame 2nd FRAME and a third frame are sequentially progressed. Each frames, 1st FRAME, 2nd FRAME and 3rd FRAME, has substantially the same period. The present exemplary embodiment provides a method for displaying 3D image on a display. That is, in order to display a 3D image, a left eye image is displayed in the first frame during intervals L1 and L2, and a right eye image is displayed in the second frame during intervals R1 and R2. Again, a left eye image having a different sequence from the first frame is displayed in the third frame during intervals L1' and L2'.

For the first frame, 1st FRAME, in the first preliminary frame charging step P1, pixel data corresponding to a (2N−1)-th pixel row is simultaneously charged into liquid crystal cells corresponding to the (2N−1)-th pixel row and the (2N)-th pixel row. An image for a left-eye is prepared the first preliminary frame charging step P1. Pixel data corresponding to the first pixel row I1 is simultaneously charged into liquid crystal cells corresponding to a first pixel row I1 and a second row I2, and pixel data corresponding to the third pixel row I3 is simultaneously charged into liquid crystal cells corresponding to a third pixel row I3 and a fourth pixel row I4. Similarly, liquid crystal cells in fifth and sixth pixel rows I5 and I6 are charged with data corresponding to a fifth pixel row, and seventh and eighth pixel rows I7 and I8 are charged with data corresponding to a seventh pixel row. Further, ninth and tenth pixel rows I9 and I10 are charged with data corresponding to a ninth pixel row, and eleventh and twelfth pixel rows I1 and I12 are charged with data corresponding to an eleventh pixel row.

In the main frame charging step M1, pixel data of liquid crystal cells corresponding to the (2N−1)-th pixel row is maintained (or hold), and a pixel data of liquid crystal cells corresponding to the (2N)-th pixel row is charged into pixel data of liquid crystal cells corresponding to the (2N)-th pixel row. In the first frame interval, 1st FRAME, a left eye image is prepared. In the main frame charging step M1, a charging status of liquid crystal cells corresponding to the first pixel row I1, the third pixel row I3, the fifth pixel row I5, the seventh pixel row I7, the ninth pixel row I9 and the eleventh pixel row I11 is maintained. In the main frame charging step M1, liquid crystal cells corresponding to the second pixel row I2 is charged with data corresponding to the second pixel row I2, and liquid crystal cells corresponding to the fourth pixel row I4, the sixth pixel row I6, the eighth pixel row I8, the tenth pixel row I10 and the twelfth pixel row I12 are charged with data corresponding to the pixel rows, respectively.

When the first frame interval period, 1st FRAME, is completed, a right eye image is prepared in the second frame interval period, 2nd FRAME, in the same way as the first frame interval period, 1st FRAME. Liquid crystal cells corresponding to each pixel row are charged in the process described above except that image data are a right eye images. When the second frame interval, 2nd FRAME, is completed, the third frame interval, 3rd FRAME, is started.

In the third frame interval, 3rd FRAME, a reversion preliminary frame charging step and a reversion main frame charging step are performed instead of the preliminary frame charging step P1 and the main frame charging step M1 that are performed in the first frame interval, 1st FRAME.

The reversion preliminary frame charging step is substantially the same as the preliminary frame charging step except that pixel data is initially charged with pixel data corresponding to a (2N)-th pixel rows. Further, the reversion main frame charging step is substantially the same as the main frame charging step except that pixel data of liquid crystal cells corresponding to the (2N)-th pixel row is maintained and pixel data corresponding to a (2N−1)-th pixel row is charged with data corresponding to the pixel rows, respectively.

Referring again to FIG. 8, in a preliminary frame charging step P1 of a first frame interval, 1st FRAME, a pixel data corresponding to a (2N−1)-th pixel row is charged into a corresponding pixel group, (2N−1)-th pixel row and (2n)th pixel row. That is, pixel data corresponding to first, third, fifth, seventh, ninth and eleventh pixel rows are charged into liquid crystal cells corresponding to second, fourth, sixth, eighth, tenth and twelfth pixel rows, respectively. However, in a revision preliminary frame charging step RP of a third frame 3rd FRAME, a pixel data corresponding to a (2N)-th pixel row is charged into a corresponding pixel group, (2N−1)-th pixel row and (2n)th pixel row. That is, pixel data corresponding to second, fourth, sixth, eighth, tenth and twelfth pixel rows are simultaneously charged into liquid crystal cells corresponding to first, third, fifth, seventh, ninth and eleventh pixel rows, respectively. In the preliminary frame and the reversion preliminary frame, initial pixel data which are charged during preliminary frame and reversion preliminary frame are adopted in an alternating manner. When the pixel group has more than three consecutive pixel rows, the three consecutive pixel rows in the pixel group may be charged simultaneously.

The reversion preliminary frame charging step RP and the reversion main frame charging step RM have reversed charge sequences than the preliminary frame charging step P1 and the main frame charging step M1. A fourth frame interval has the reversion preliminary frame charging step and the reversion main frame charging step of the second Frame. A fifth frame interval has the sequence identical to the first frame interval.

In the preliminary frame charging step P1 and the main frame charging step M1, a difference between a charging start time of the first pixel row and a charging start time of the last pixel row may be a half of a standard charging time (t/2) of the liquid crystal cells. Thus, a scanning delay time, which is between a charging start time of the first pixel row and a charging start time of the last pixel row, of the present exemplary embodiment is a half of a standard charging time (t/2). In the preliminary frame charging step P after a charging of the first pixel row I1 is started, charging of the eleventh and twelfth pixel rows I11 and I12 are started after a half of a standard charging time (t/2) of the liquid crystal cells is elapsed. It means that a time for charging all pixel rows of a display is a half of a standard charging time (t/2) of liquid crystal cells. Thus, a delay time of one frame may be reduced to about a half.

The preliminary frame charging step P1 and the main frame charging step M1 may be performed during a standard charging time 't' of the liquid crystal cell. Each of the charging steps P1 and M1 may be progressed during a standard charging time 't' of liquid crystal cells corresponding to each pixel row. A charging of liquid crystal cells of one pixel row I1 in a first pixel group (pixels in pixel rows I1 and I2) may be completed during the preliminary frame charging step P1, and a charging of liquid crystal cells of the other pixel row I2 in the first pixel group may be completed during the main frame charging step M1. Because a charging of liquid crystal cells corresponding (2N)-th pixel row is completed in the preliminary frame charging step P1 as data of (2N−1)-th pixel row, liquid crystal cells corresponding to a (2N)-th pixel row can be charged in a short time.

The backlight may be sequentially turned on at the latter part of the preliminary frame charging step P1 of each pixel row and turned off before ending of the main frame charging step M1 of each pixel row.

In a comparative embodiment of FIG. 4, when the backlight unit is turn on sequentially per each pixel row, the backlight is turned on during an interval corresponding to the main frame charging step M1. Conventionally, when a 3D image is displayed on the display, a changing of a left eye image and a right eye image is performed. In a comparative embodiment of FIG. 4, when a changing of a left eye image and a right eye image is performed, a black image has to be inserted between the left eye image and the right eye image to reduce a cross-talk. However, it is not necessary to insert a black image between the left eye image and the right eye image in this exemplary embodiment. In addition, a turn on time of a backlight unit may be extended longer than that of a conventional driving method, so that a brightness of an image may be increased.

Figure 9:
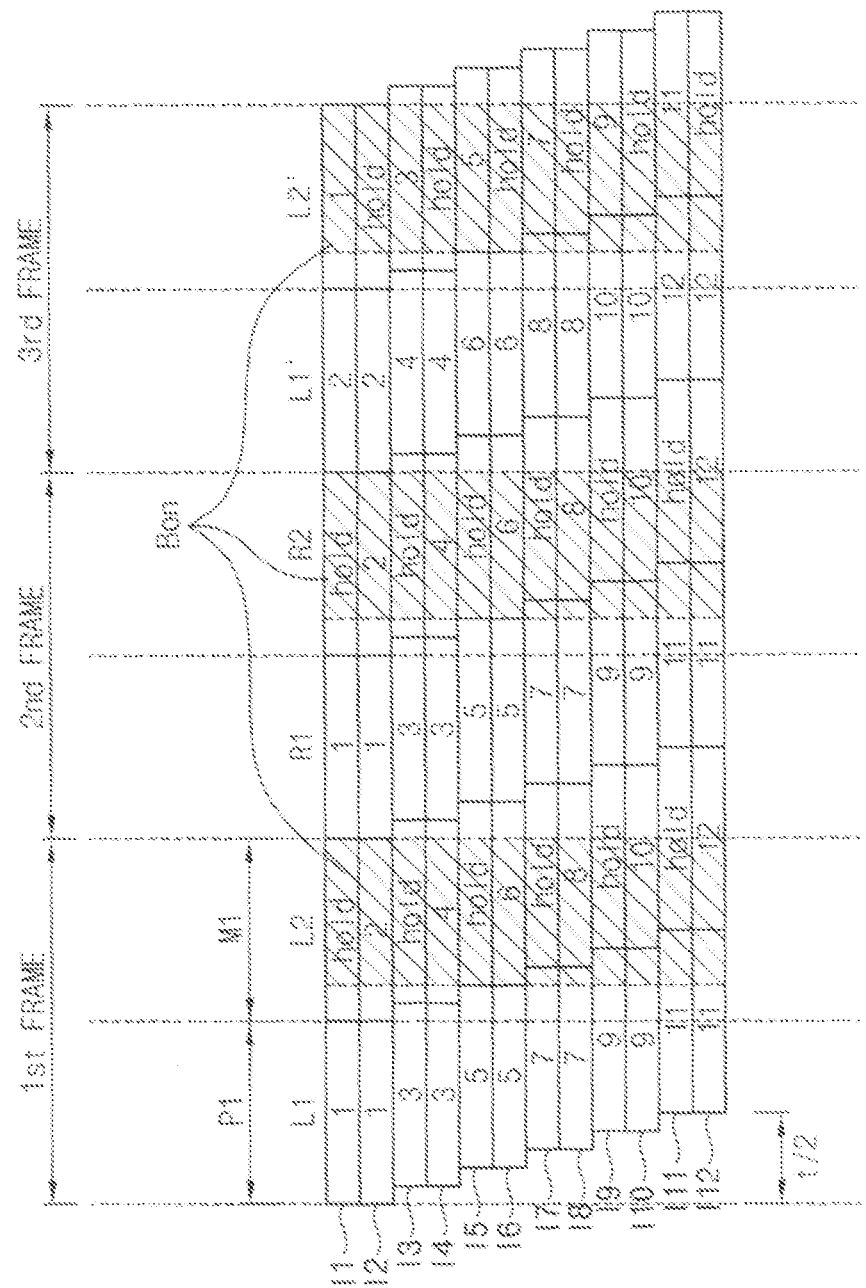
FIG. 9 is a concept diagram schematically showing a driving method of a display device according to another exemplary embodiment of the present invention.

FIG. 9 is a concept diagram schematically showing a driving method of a display device according to another exemplary embodiment of the present invention.

A driving of each pixel row described in FIG. 9 is substantially the same as the driving of each pixel row described in FIG. 8 except for a driving time of a backlight unit. The backlight unit is driven sequentially corresponding to each pixel row in an exemplary embodiment of FIG. 8. The backlight unit of the driving method of FIG. 9 is turned-on simultaneously.

Referring to FIG. 9, the backlight may be turned on after ending of a preliminary frame charging step P1 of the first pixel row t1 and turned off before ending of an interval that a main frame charging step M1 of the first pixel row I1. As described above, after the preliminary frame charging step P1 is completed, each of the pixels in a pixel group has a charged status which is charged by an image data of the corresponding pixel groups. Thus the liquid crystal cells can be charged to their image data in a short time. As a result, a turn-on time of a backlight unit may be extended longer than that of a conventional driving method, so that a brightness of an image may be increased.

In the comparative embodiment of FIG. 6, when the backlight unit is turned on simultaneously, the backlight unit may be turned on during a short interval. As described above, the backlight unit must be turned on in a status that liquid crystal cells corresponding to each pixel row are effectively charged. An interval that the first pixel row and the last pixel row are effectively charged in the comparative embodiment of FIG. 6 is very short. Therefore, the backlight unit may be turn on for a short time, so that a luminance of a display may be decreased. When the display device is a switchable device which can display a 2D image and a 3D image according to a source of data to be displayed, a luminance of the 3D image may be rapidly decreased.

In a driving method of a display device according to the present exemplary embodiment, a difference between a driving star time of the first pixel row I1 and a driving start time of the twelfth pixel row I12 is a half of a start charging time 't' of the liquid crystal cells, so that an effective charging interval capable of providing light to the display may be increased. Referring to FIG. 9, the backlight unit is turned on after ending of a preliminary frame charging step P1 of the first pixel row I1 and before ending of a main frame charging step M1 of the first pixel row I1. Thus, a total luminance according to the present exemplary embodiment may be increased rather than that of a conventional driving method.

Figure 10:
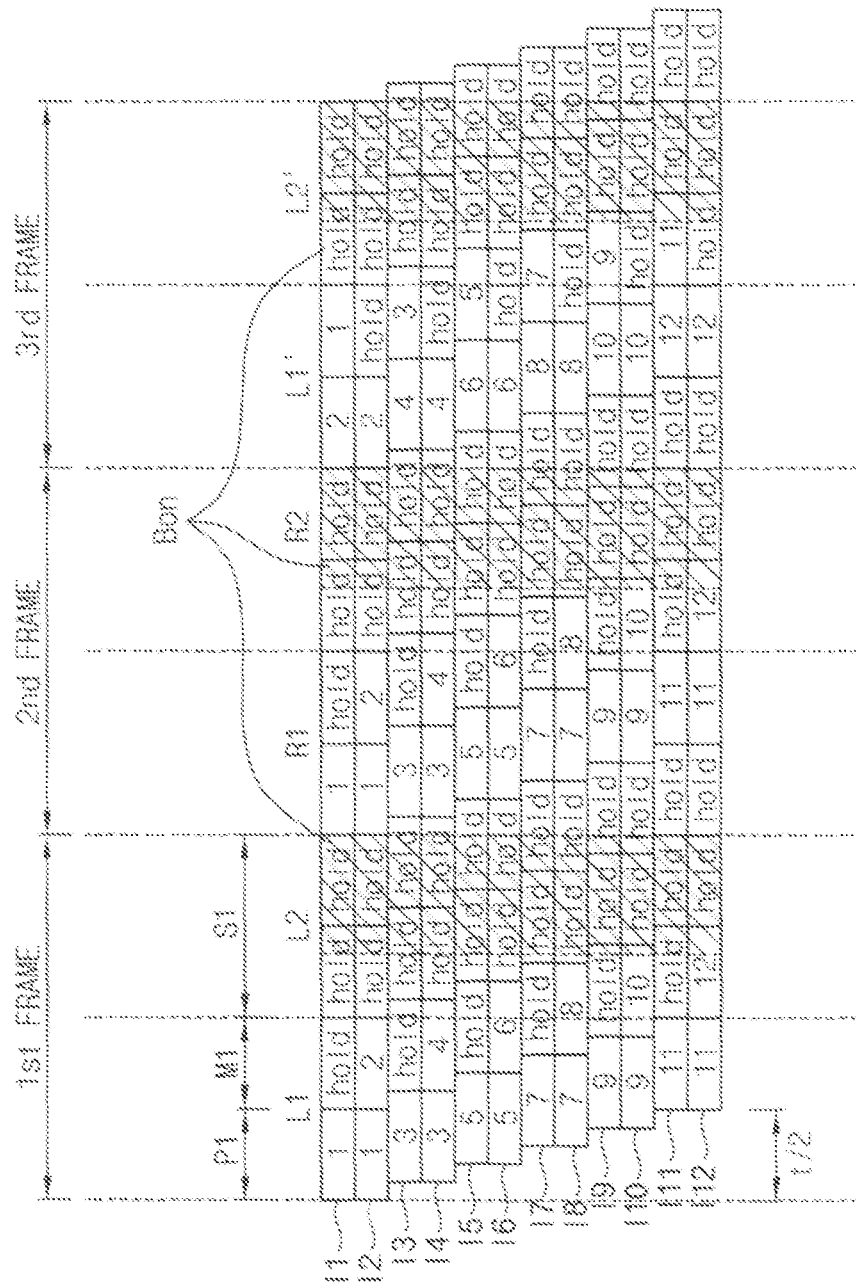
FIG. 10 is a concept diagram schematically showing a driving method of a display device according to another exemplary embodiment of the present invention.

FIG. 10 is a concept diagram schematically showing a driving method of a display device according to another exemplary embodiment of the present invention.

Referring to FIG. 10, a driving method of a display device includes a preliminary frame charging step P1, a main frame charging step M1 and a frame maintaining step S1. In FIG. 10, for convenience of description, it is assumed that display device has twelve pixel rows. Generally, display device has more than one thousand rows to display a high quality image.

In the first preliminary frame charging step P1, a pixel data corresponding to a (2N−1)-th pixel row is simultaneously charged into liquid crystal cells corresponding to the (2N−1)-th pixel row and the (2N)-th pixel row. A pixel data corresponding to the first pixel row I1 is simultaneously charged into liquid crystal cells corresponding to a first pixel row I1 and a second pixel row I2, and pixel data corresponding to the third pixel row I3 is simultaneously charged into liquid crystal cells corresponding to a third pixel row I3 and a fourth pixel row I4. Similarly, liquid crystal cells in fifth and sixth pixel rows I5 and I6 are charged with data corresponding to a fifth pixel row, and seventh and eighth pixel rows I7 and I8 are charged with data corresponding to a seventh pixel row. Further, ninth and tenth pixel rows I9 and I10 are charged with data corresponding to a ninth pixel row, and eleventh and twelfth pixel rows I11 and I12 are charged with data corresponding to an eleventh pixel row.

In the main frame charging step M1, pixel data of liquid crystal cells corresponding to the (2N−1)-th pixel row is maintained, and a pixel data of liquid crystal cells corresponding to the (2N)-th pixel row is charged into pixel data of liquid crystal cells corresponding to the (2N)-th pixel row. In the main frame charging step M1, a charging status of liquid crystal cells corresponding to the first pixel row I1, the third pixel row I3, the fifth pixel row I5, the seventh row I7, the ninth pixel row I9 and the eleventh row I11 is maintained. In the main frame charging step M1, liquid crystal cells corresponding to the second pixel row I2 is charged with a data corresponding to the second pixel row I2, and liquid crystal cells corresponding to the fourth pixel row I4, the sixth pixel row I6, the eighth pixel row I8, the tenth pixel row I10 and the twelfth pixel row I12 are charged with data corresponding to the pixel rows, respectively.

In the frame maintaining step S1, a voltage charged into liquid crystal cells of all pixel rows I1, I2, I3, . . . , I10, I11 and I12 is maintained. The preliminary frame charging step P1 and the main frame charging step M1 are progressed during a first half of a standard charging time (t/2) of the liquid crystal cells, and the frame maintaining step S1 is progressed during a standard charging time (t) of the liquid crystal cells. In the preliminary frame charging step P1 and the main frame charging step M1, a difference between a charging start time of the first pixel row and a charging start time of the last pixel row may be a half of a standard charging time (t/2) of the liquid crystal cells. In the preliminary frame charging step P1 after a charging of the first pixel row I1 is started, charging of the eleventh and twelfth pixel rows I11 and I12 are started after a half (t/2) of a standard charging time of the liquid crystal cells is elapsed. It means that a time for charging all pixel rows of a display is a half of a standard charging time (t2) of liquid crystal cells. Thus, a scanning delay time of one frame may be reduced to about a half.

Moreover, in the present embodiment, during the frame maintaining step S1, all liquid crystal cells of a display device may maintain a status that a charging is completed. A maintaining interval of the charging may be extended in comparison with another exemplary embodiment. In the present exemplary embodiment, the backlight unit may be turned on simultaneously. The backlight may be turned-on after a beginning of a main frame charging step M1 of the last pixel row I12 and may be turned-off before an ending of a frame maintaining step S1 of the pixel row I1. Thus, a turn-on time of a backlight unit may be extended longer than that of a conventional backlight unit, so that a brightness of an image may be increased.

The present exemplary embodiment may be compared with a comparative embodiment of FIG. 6. In the comparative embodiment of FIG. 6, when the backlight is turned on simultaneously, the backlight turn on time cannot be extended because the backlight unit must provide light to the display device after all liquid crystal cells of a display device are charged with a voltage corresponding to an image. According to the exemplary embodiment, a light providing time of a backlight unit may be extended longer than that of a conventional backlight unit, so that a brightness of an image may be increased.

Referring to FIGS. 8 to 10, when a preliminary frame charging step P1 and a main frame charging step M1 are repeated to display a succeeding frame, a charge sequences may be reversed.

In a case that a pixel data corresponding to a (2N−1)-th pixel row is charged into liquid crystal cells corresponding to the (2N−1)-th pixel row and the (2N)-th pixel row in a previous preliminary frame charging step, the reversion preliminary frame charging step is a step that a pixel data corresponding to the (2N)-th pixel row is simultaneously charged into liquid crystal cells corresponding to the (2N−1)-th pixel row and the (2N)-th pixel row. In the main frame charging step M1 after the reversion preliminary frame charging step, a voltage of liquid crystal cells corresponding to the 2N-th pixel row is maintained, and a pixel data corresponding to the (2N−1)-th pixel row is charged into liquid crystal cells corresponding to the (2N−1)-th pixel row. Thus, an image quality deterioration such as an image distortion may be prevented.

Referring again to FIG. 10, in a first frame interval, 1st FRAME, a pixel data corresponding to a (2N−1)-th pixel row is simultaneously charged into liquid crystal cells corresponding to the (2N−1)-th pixel row and the (2N)-th pixel row. However, in a third frame interval 3rd FRAME, a pixel data corresponding to a (2N)-th pixel row is simultaneously charged into liquid crystal cells corresponding to the (2N−1)-th pixel row and the (2N)-th pixel row. Similarly, in a second frame interval 2nd FRAME, a pixel data corresponding to a (2N−1)-th pixel row is simultaneously charged into liquid crystal cells corresponding to the (2N−1)-th pixel row and the (2N)-th pixel row. Although not shown in FIG. 10, in a fourth frame interval, a pixel data corresponding to a (2N)-th pixel row is simultaneously charged into liquid crystal cells corresponding to the (2N−1)-th pixel row and the (2N)-th pixel row.

Although not shown in FIG. 10, the fourth frame interval, 4th FRAME, may include intervals R1' and R2' displaying each right eye image on the display device.

Figure 11:
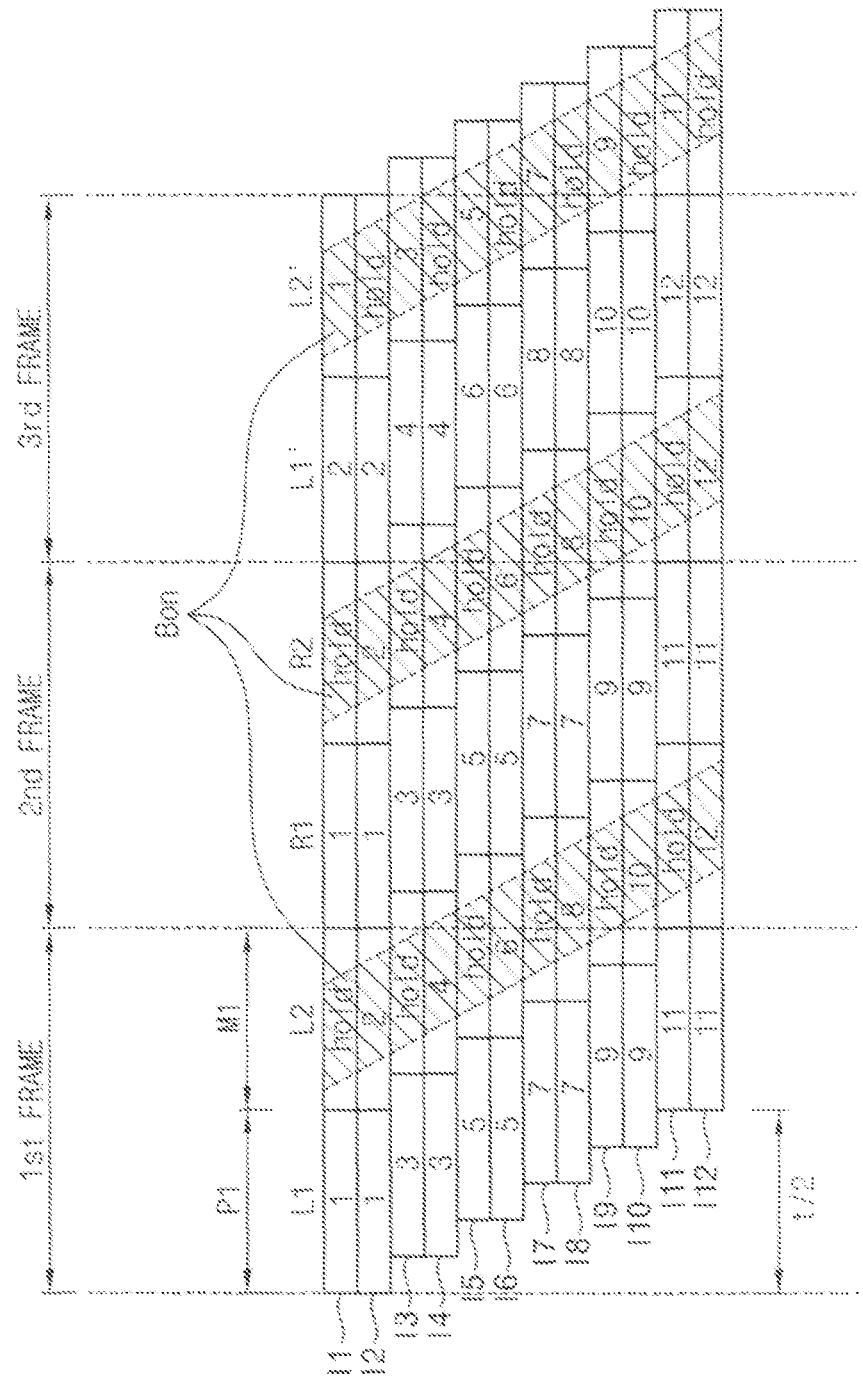
FIG. 11 is a concept diagram schematically showing a driving method of a display device according to another exemplary embodiment of the present invention.

FIG. 11 is a concept diagram schematically showing a driving method of a display device according to another exemplary embodiment of the present invention.

A driving method of a display device in accordance with the present exemplary embodiment of FIG. 11 is substantially the same as the driving method of a display device in accordance with the exemplary embodiment of FIG. 8 except for at least a driving of a backlight unit. Thus, any repetitive detailed description may hereinafter be omitted.

Referring to FIG. 11, a driving method of a display device includes a preliminary frame charging step P1 and a main frame charging step M1. In the first preliminary frame charging step P1, a pixel data corresponding to a (2N−1)-th pixel row is simultaneously charged into liquid crystal cells corresponding to the (2N−1)-th pixel row and the (2N)-th pixel row. A pixel data corresponding to the first pixel row I1 is simultaneously charged into liquid crystal cells corresponding to the first pixel row I1 and the second pixel row I2, and pixel data corresponding to the third pixel row I3 is simultaneously charged into liquid crystal cells corresponding to the third pixel row I3 and the fourth pixel row I4. In the main frame charging step M1, a voltage of liquid crystal cells corresponding to the (2N−1)-th pixel row is maintained, and a pixel data corresponding to the (2N)-th pixel row is charged into liquid crystal cells corresponding to the (2N)-th pixel row.

In the preliminary frame charging step P1 and the main frame charging step M1, a difference between a charging start time of the first pixel row and a charging start time of the last pixel row may be a half of a standard charging time (t/2) of the liquid crystal cells. In the preliminary frame charging step P1, a charging of the eleventh and twelfth pixel rows I11 and I12 are started after a half of a standard charging time (t/2) of the liquid crystal cells is elapsed from a beginning of a charging of the pixel rows I1 and I2. It means that a time for charging all pixel rows of a display device is a half of a standard charging time (t/2) of liquid crystal cells. Thus, a delay time of one frame may be reduced to about a half.

During the main frame charging step M1 is progressed, the backlight may be turned-on. Backlight is sequentially turned-on during the main frame charging step M1 of each pixel row, so that the liquid crystal cells corresponding to the pixel row may display an image.

Figure 12:
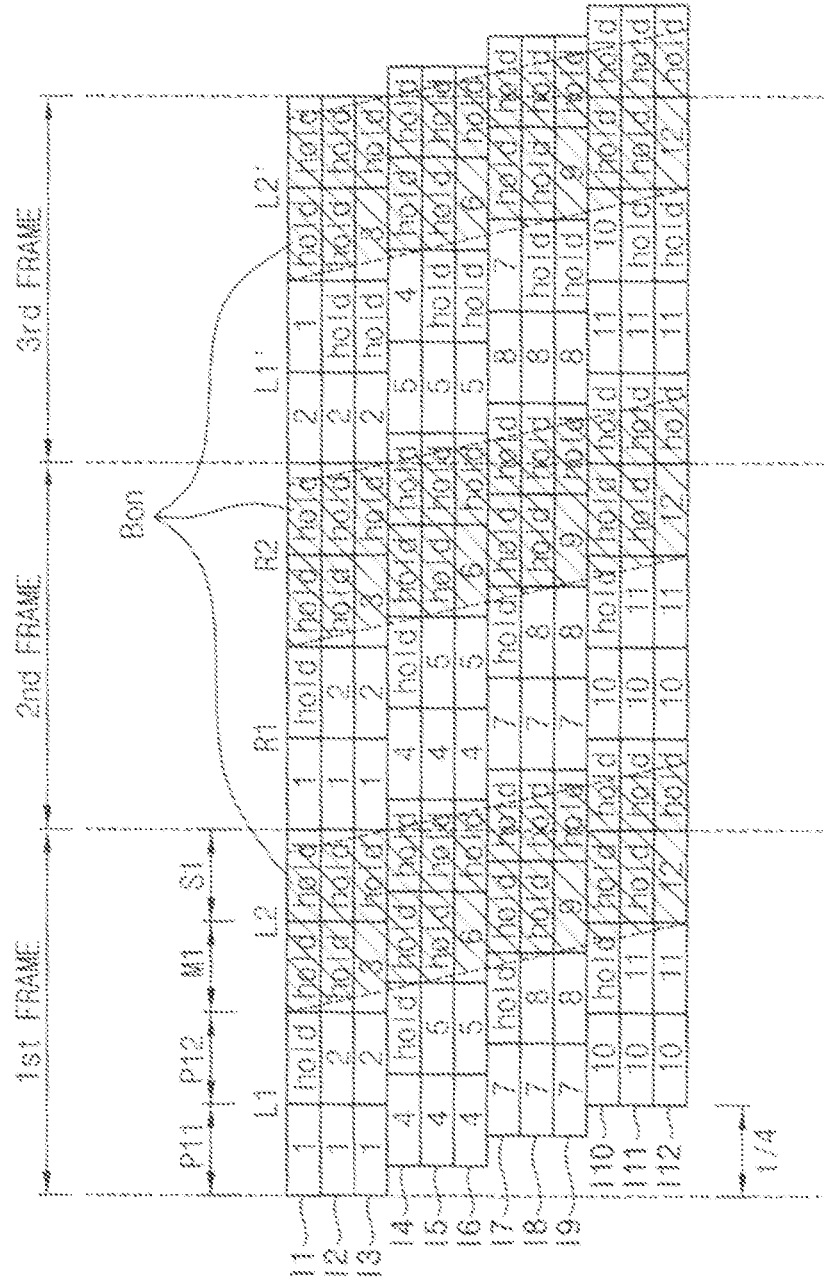
FIG. 12 is a concept diagram schematically showing a driving method of a display device according to another exemplary embodiment of the present invention.

FIG. 12 is a concept diagram schematically showing a driving method of a display device according to another exemplary embodiment of the present invention.

Referring to FIG. 12, a driving method of a display device includes a first preliminary frame charging step P11, a second preliminary frame charging step P12 and a main frame charging step M1. In FIG. 12, for convenience of description, it is assumed that display device has twelve pixel rows.

In the first preliminary frame charging step P11, a pixel data of a first representative pixel row among a (3N−2)-th pixel row, a (3N−1)-th pixel row and a 3N-th pixel row is simultaneously charged into liquid crystal cells corresponding to the (3N−2)-th pixel row, the (3N−1)-th pixel row and an 3N-th pixel row. A pixel data corresponding to the first pixel row I1 is simultaneously charged into liquid crystal cells corresponding to the first pixel row I1, the second pixel row I2 and the third pixel row I3. A pixel data corresponding to the fourth pixel row I4 is simultaneously charged into liquid crystal cells corresponding to the fourth pixel row I4, the fifth pixel row I5 and the sixth pixel row I6. Similarly, the seventh, eighth and ninth pixel rows I7, I8 and I9 are charged with data corresponding to the seventh pixel row, and tenth, eleventh and twelfth pixel rows I10, I11 and I12 are charged with data corresponding to the tenth pixel row.

In the second preliminary frame charging step P12, a voltage of liquid crystal cells corresponding to the first representative pixel row is maintained, a second representative pixel row is selected from pixel rows except for the first representative pixel row, and then a pixel data of the second representative pixel row is simultaneously charged into liquid crystal cells corresponding to remaining two pixel rows. Liquid crystal cells corresponding to the first pixel row I1 maintain a voltage, and liquid crystal cells corresponding to the second pixel row I2 and the third pixel row I3 are simultaneously charged with a pixel data corresponding to the second pixel row I2. Liquid crystal cells corresponding to the fourth pixel row I4 maintain a voltage, and liquid crystal cells corresponding to the fifth pixel row I5 and the sixth pixel row I6 are simultaneously charged with a pixel data corresponding to the fifth pixel row I5. Similarly, liquid crystal cells corresponding to the seventh and tenth pixel rows I7 and I10 maintain a voltage, liquid crystal cells corresponding to the eighth and ninth pixel rows I8 and I9 are charged with a pixel data corresponding to the eighth pixel row I8, and liquid crystal cells corresponding to the eleventh and twelfth pixel rows I11 and I12 are charged with a pixel data corresponding to the eleventh pixel row I11.

In the main frame charging step M1, a voltage of liquid crystal cells corresponding to the first representative pixel row and the second representative pixel row is maintained, and a pixel data corresponding to one of the remaining pixel rows is charged into liquid crystal cells corresponding to one of the remaining pixel row.

Liquid crystal cells corresponding to the first pixel row I1 and the second pixel row I2 maintain a voltage, and liquid crystal cells corresponding to the third pixel row I3 is charged with a pixel data corresponding to the third pixel row I3. Liquid crystal cells corresponding to the fourth pixel row I4 and the fifth pixel row I5 maintain a voltage, and liquid crystal cells corresponding to the sixth pixel row I6 is charged with a pixel data corresponding to the sixth pixel row I6. Similarly, liquid crystal cells corresponding to the seventh, eighth, tenth and eleventh pixel rows I7, I8, I10 and I11 maintain a voltage, liquid crystal cells corresponding to the ninth pixel row I9 is charged with a pixel data corresponding to the ninth pixel row I9, and liquid crystal cells corresponding to the twelfth pixel row I12 is charged with a pixel data corresponding to the twelfth pixel row I12.

In the first preliminary frame charging step P11, the second preliminary frame charging step P12 and the main frame charging step M1, a difference between a charging start time of the first pixel row and a charging start time of the last pixel row may be a quarter of a standard charging time (t/4) of the liquid crystal cells. In the first preliminary frame charging step P11, charging of the pixel data in tenth, eleventh and twelfth pixel rows I10, I11 and I12 are started after a quarter of a standard charging time (t/4) of the liquid crystal cells is elapsed from a beginning of a charge of the pixel data in the first, the second and the third pixel rows. It means that a time for charging all pixel rows of a display device is a quarter of a standard charging time (t/4) of liquid crystal cells. Thus, a delay time of one frame may be reduced to about a quarter.

Moreover, a driving method of a display apparatus according to the present exemplary embodiment may further include a frame maintain step S1 which maintains voltages of liquid crystal cells corresponding to the (3N−2)-th pixel row, the (3N−1)-th row and an 3N-th pixel row. In the frame maintaining step S1, voltages of liquid crystal cells corresponding to the pixel rows I1, I2, I3, . . . , I10, I11 and I12 are maintained.

The first and second preliminary frame charging steps P11 and P12 and the main frame charging step M1 may be progressed during a quarter of a standard charging time (t/4) of each of the liquid crystal cell. Each of the charging steps P11, P12 and M1 is progressed during a quarter of a standard charging time (t/4) of each of the liquid crystal cell corresponding to each pixel row. Moreover, the frame maintaining step S1 may be progressed during a quarter of a standard charging time (t/4) of each of the liquid crystal cell similar to the first and the second preliminary frame charging steps P11 and P12 and the main frame charging step M1. Thus, a sum of the charging steps P11, P12 and M1 and the maintaining step S1 may correspond with one frame interval I FRAME.

Liquid crystal of the display device may have a short charging time. In this case, the first and the second preliminary frame charging steps P11 and P12, the main frame charging step M1 and the frame maintaining step S1 may be more than about $\frac{1}{3}$ of a standard charging time of the liquid crystal cells.

Moreover, the backlight may be turned on during the main frame charging step M1 and the frame maintaining step S1 to display an image. When the backlight is turned on sequentially by areas corresponding to the pixel rows, a light may be turned on after a beginning of the main frame charging step M1 and turned off before an ending of the frame maintaining step S1.

Figure 13:
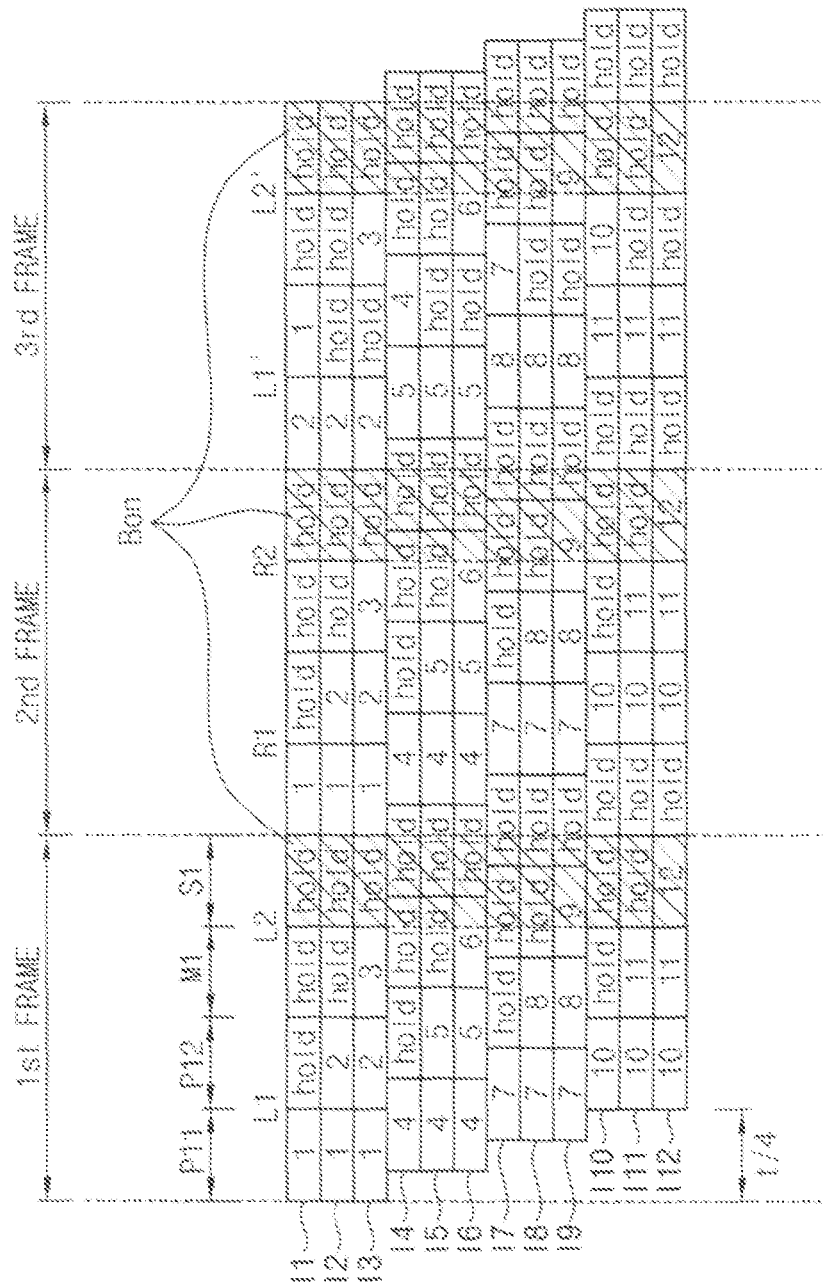
FIG. 13 is a concept diagram schematically showing a driving method of a display device according to another exemplary embodiment of the present invention.

FIG. 13 is a concept diagram schematically showing a driving method of a display device according to another exemplary embodiment of the present invention.

A driving method of a display device in accordance with the present exemplary embodiment of FIG. 13 is substantially the same as the driving method of a display device in accordance with the exemplary embodiment of FIG. 12 except for at least a driving of a backlight unit. Thus, any repetitive detailed description may hereinafter be omitted.

A driving method of a display apparatus according to the present exemplary embodiment may include a first preliminary frame charging step P11, a second preliminary frame charging step P12 and a main frame charging step M1. In the first preliminary frame charging step P11, a pixel data of a first representative pixel row among a (3N−2)-th pixel row, a (3N−1)-th pixel row and a 3N-th pixel row is simultaneously charged into liquid crystal cells corresponding to the (3N−2)-th pixel row, the (3N−1)-th pixel row and an 3N-th pixel row. In the second preliminary frame charging step P12, a voltage of liquid crystal cells corresponding to the first representative pixel row is maintained, a second representative pixel row is selected from pixel rows except for the first representative pixel row, and then a pixel data of the second representative pixel row is simultaneously charged into liquid crystal cells corresponding to remaining two pixel lines. In the main frame charging step M1, voltages of liquid crystal cells corresponding to the first representative pixel row and the second representative pixel row are maintained, and then a pixel data of the remaining one pixel row is simultaneously charged into liquid crystal cells corresponding to the remaining one pixel row. Moreover, a driving method of a display apparatus according to the present exemplary embodiment may further include a frame maintain step S1 which maintains voltages of liquid crystal cells corresponding to the (3Nβ-2)-th pixel row, the (3Nβ-1)-th pixel row and an 3N-th pixel row.

The backlight is turned on simultaneously. The backlight may be turned on after an ending of the main frame charging step M1 and before an ending of the frame maintaining step S1.

Figure 14:
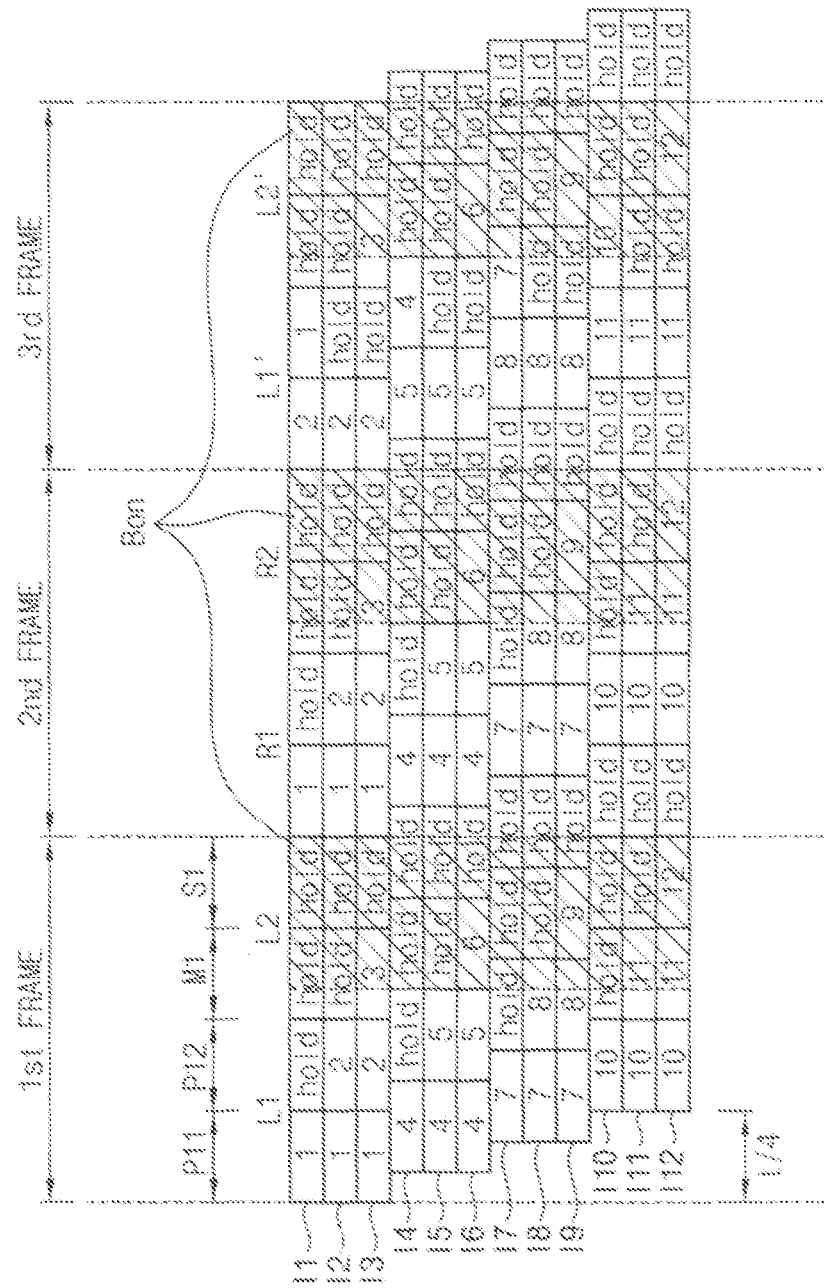
FIG. 14 is a concept diagram schematically showing a driving method of a display device according to another exemplary embodiment of the present invention.

FIG. 14 is a concept diagram schematically showing a driving method of a display device according to another exemplary embodiment of the present invention.

Referring to FIG. 14, a driving method of a display device in accordance with the present exemplary embodiment of FIG. 14 is substantially the same as the driving method of a display device in accordance with the exemplary embodiment of FIG. 13 except for at least a driving of a backlight unit. Thus, any repetitive detailed description may hereinafter be omitted.

A driving method of a display apparatus according to the present exemplary embodiment may include a first preliminary frame charging step P11, a second preliminary frame charging step P12 and a main frame charging step M1. In the first preliminary frame charging step P1, a pixel data of a first representative pixel row among a (3N−2)-th pixel row, a (3N−1)-th pixel row and a 3N-th pixel row is simultaneously charged into liquid crystal cells corresponding to the (3N−2)-th pixel row, the (3N−1)-th pixel row and an 3N-th pixel row. In the second preliminary frame charging step P12, a voltage of liquid crystal cells corresponding to the first representative pixel row is maintained, a second representative pixel row is selected from pixel rows except for the first representative pixel row, and then a pixel data of the second representative pixel row is simultaneously charged into liquid crystal cells corresponding to remaining two pixels. In the main frame charging step M1, voltages of liquid crystal cells corresponding to the first representative pixel row and the second representative pixel row are maintained, and then a pixel data of the remaining one pixel row is simultaneously charged into liquid crystal cells corresponding to remaining one pixel. Moreover, a driving method of a display apparatus according to the present exemplary embodiment may further include a frame maintain step S1 which maintains voltages of liquid crystal cells corresponding to the (3N−2)-th pixel row, the (3N−1)-th pixel row and an 3N-th pixel row.

The backlight is turned on simultaneously. The backlight may be turned on after a beginning of the main frame charging step M1 and before an ending of the frame maintaining step S1.

Figure 15:
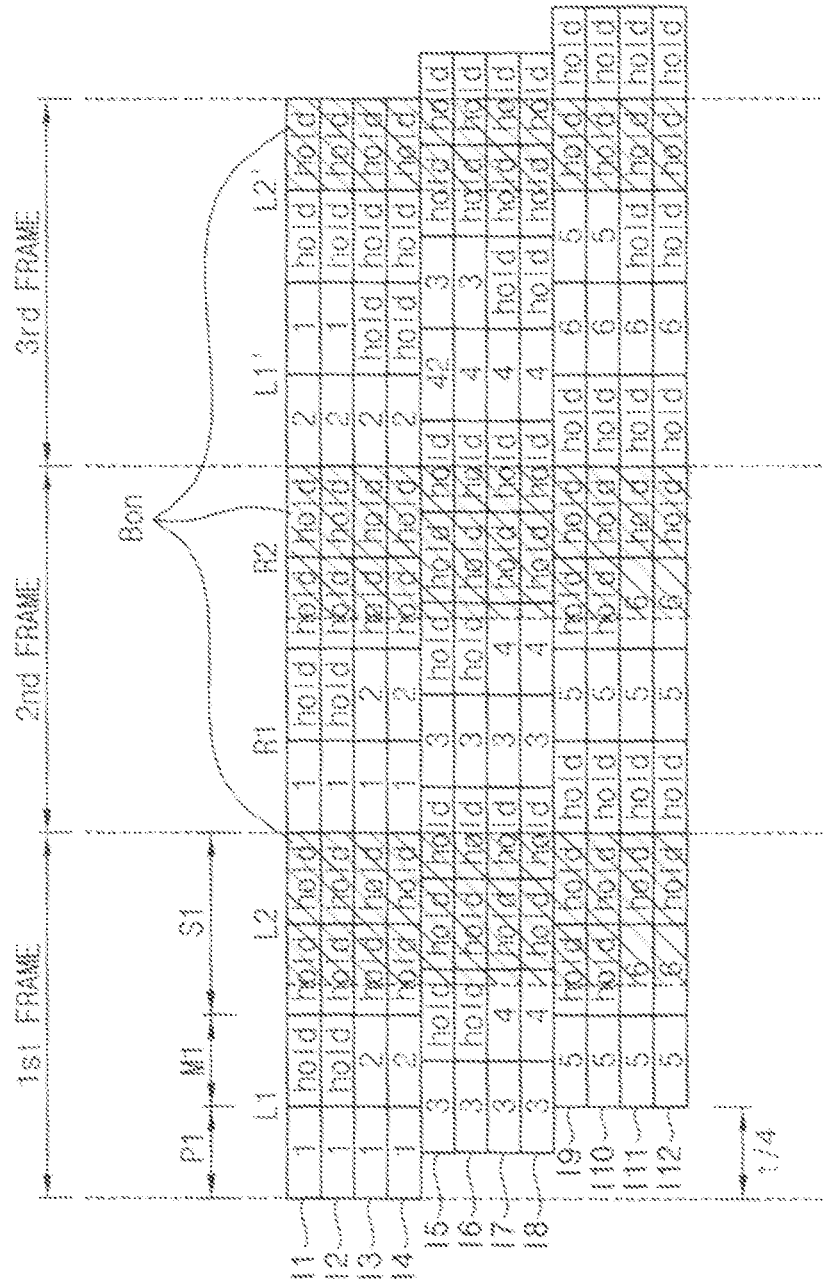
FIG. 15 is a concept diagram schematically showing a driving method of a display device according to another exemplary embodiment of the present invention.

FIG. 15 is a concept diagram schematically showing a driving method of a display device according to another exemplary embodiment of the present invention.

Referring to FIG. 15, a driving method of a display device includes a preliminary frame charging step P1, a main frame charging step M1 and a frame maintaining step S1. In the preliminary frame charging step P1, liquid crystal cells respectively corresponding to the (4N−3)-th pixel row, the (4N−2)-th pixel row, the (4N−1)-th pixel row and the (4N)-th pixel row are charged with a voltage of pixel data corresponding to the (4N−3)-th pixel row. That is, liquid crystal cells respectively corresponding to first to fourth pixel rows I1, I2, I3 and I4 are simultaneously charged with a voltage of pixel data corresponding to the first pixel row I1. Moreover, liquid crystal cells respectively corresponding to fifth to eighth pixel rows I5, I6, I7 and I8 are simultaneously charged with a voltage of pixel data corresponding to the fifth pixel row I5. Similarly, liquid crystal cells respectively corresponding to ninth to twelfth pixel rows I9, I10, I11 and I12 are simultaneously charged with a voltage of pixel data corresponding to the ninth pixel row I9.

In the main frame charging step M1, a voltage of liquid crystal cells respectively corresponding to the (4N−3)-th pixel row and the (4N−2)-th pixel row is maintained, and liquid crystal cells respectively corresponding to the (4N−1)-th pixel row and the (4N)-th pixel row are charged with a voltage of a pixel data corresponding to the (4N−1)-th pixel row. That is, a voltage of liquid crystal cells respectively corresponding to first and second pixel rows I1 and I2 is maintained, and liquid crystal cells respectively corresponding to third and fourth pixel rows I3 and I4 are simultaneously charged with a voltage of a pixel data corresponding to the third pixel row I3. Moreover, a voltage of liquid crystal cells respectively corresponding to fifth and sixth pixel rows I5 and I6 is maintained, and liquid crystal cells respectively corresponding to seventh and eighth pixel rows I7 and I8 are simultaneously charged with a voltage of a pixel data corresponding to the seventh pixel row I7. Similarly, a voltage of liquid crystal cells respectively corresponding to ninth and tenth pixel rows I9 and I10 is maintained, and liquid crystal cells respectively corresponding to eleventh and twelfth pixel rows I11 and I12 are simultaneously charged with a voltage of a pixel data corresponding to the eleventh pixel row I11.

In the frame maintaining step S1, a voltage of liquid crystal cells respectively corresponding to the (4N−3)-th pixel row, the (4N−2)-th pixel row, the (4N−1)-th pixel row and the (4N)-th pixel row is maintained. That is, a charging voltage of all liquid crystal cells corresponding to the first to twelfth pixel rows I1, I2, I3, . . . , I10, I11 and I12 is maintained.

Referring again to FIG. 15, in a driving method of a display device according to the present exemplary embodiment, in the first preliminary frame charging step P1, the main frame charging step M1 and the frame maintaining step S1, a difference between a charging start time of the first pixel row I1 and a charging start time of the last pixel row I12 or a difference between a maintaining start time of the first pixel row I1 and a maintaining start time of the last pixel row I12 may be a quarter of a standard charging time (t/4) of the liquid crystal cells. Since a charging is progressed by four pixel rows on a display, the difference between a charging start time of the first pixel row I1 and the last pixel row I12 may be decreased to about ¼ in comparison with a conventional art.

Moreover, the preliminary frame charging step P1 and the main frame charging step M1 may be about a quarter of a standard time (t/4) of the liquid crystal cell, and the frame maintaining step S1 may be about a half of a standard time (t/2) of the liquid crystal cell. Thus, a sum of the preliminary frame charging step P1, the main frame charging step M1 and the frame maintaining step S1 may be substantially equal to the standard charging time 't' of corresponding liquid crystal cell. As described above, since a difference between start times or ending time of each step of the first pixel row I1 and the last pixel row I12 within one frame is a quarter of a standard charging time 't' (t/4) of a liquid crystal cell, a delay time between each pixel rows is reduced. Thus, a backlight unit may be simultaneously turned on while maintaining a sufficient luminance to the display.

In a method of driving a display device in accordance with the present exemplary embodiment, the backlight may be turned on during the frame maintaining step S1 of the first pixel row I1.

Referring again to FIG. 7, since a frequency of a liquid crystal display panel is low, the liquid crystal display panel may have a relatively lower resolution. Since a liquid crystal display device according to FIG. 7 uses a liquid crystal display panel of a low frequency, the liquid crystal display device according to FIG. 7 displays an image of a limited resolution. Moreover, since the liquid crystal display device must be turned on during an effective charging state of liquid crystals in the display, a backlight unit cannot be driven simultaneously.

On the other hand, since a display device in the present exemplary embodiment of FIG. 15, pixel groups have four pixel rows, respectively, and the frame maintaining step S1 is a half of a standard charging time 't' of liquid crystal cells, the backlight unit may be turned on for a sufficient interval. Moreover, a difference between a charging and a maintaining start time of the first pixel row I1 and a charging and a maintaining start time of the last pixel row I12 is a quarter of a standard charging time (t4) of liquid crystal cells, so that an image may be displayed on a display device without using a sequentially driving of backlight unit while maintaining a sufficient luminance of the display.

Although not shown in drawings, a driving method of a display device according to exemplary embodiments of the present invention may include a preliminary frame charging step and a main frame charging step.

In the preliminary frame charging step, voltages of liquid crystal cells in a pixel group including n pixel rows are charged as a pixel data of one pixel row of the pixel group. In the main frame charging step, liquid crystal cells of a pixel row charged with pixel data of the pixel row maintain the pixel data, and liquid crystal cells of other pixel row which are not charged with pixel data of the other pixel rows are charged with pixel data of the other pixel row. The preliminary frame charging step is a step which simultaneously charges pixels of plural pixel rows within the pixel group with data of one of a pixel row in the pixel group. The main frame charging step is a step which charges pixel rows in the pixel group with data of the pixel rows. The main frame charging step is repeated until all pixel rows have its own pixel data.

The main frame charging step may be varied in accordance with the number of pixel rows (n) in a pixel group (wherein n is natural numbers greater than 2). For example, the main frame charging step may be repeated (n−1) times per one frame. Each of the preliminary frame charging step and the main frame charging step may be progressed during a time shorter than 1/n of a standard charging time (t) of the liquid crystal cells. The reason that each of the preliminary frame charging step and the main frame charging step is progressed during a time shorter than 1/n of a standard charging time (t) of the liquid crystal cells is that the driving method may further include a frame maintaining step.

A driving method of a display device according to exemplary embodiments of the present invention may further include a frame maintaining step S1 which maintains a voltage of liquid crystal cells of all pixel rows. The frame maintaining step S1 is a step that liquid crystal cells corresponding to each pixel row have an effective charging status. As a time of the frame maintaining step S1 becomes longer, an interval capable of receiving light from a backlight unit becomes longer. Therefore, total luminance of a display device may be increased. The total time of the preliminary frame charging step, the main frame charging step and the frame maintaining step may be substantially equal to the standard charging time of the liquid crystal cells.

Figure 16:
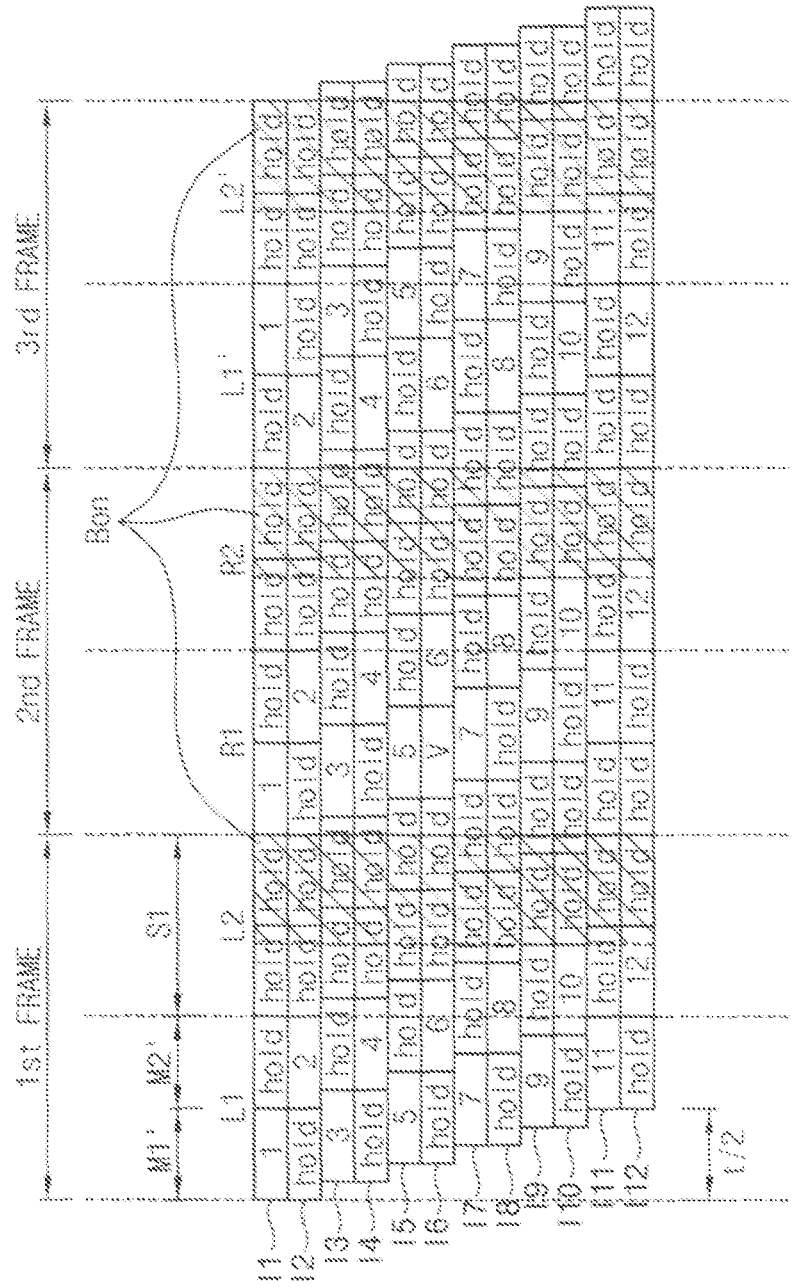
FIG. 16 is a concept diagram schematically showing a driving method of a display device according to another exemplary embodiment of the present invention.

FIG. 16 is a concept diagram schematically showing a driving method of a display device according to another exemplary embodiment of the present invention.

Referring to FIG. 16, a driving method of a display device includes frame charge-maintaining steps M1' and M2' and a frame maintaining step S1. In FIG. 16, for convenience of description, it is assumed that display device has twelve pixel rows.

In the frame charge-maintaining steps M1' and M2', liquid crystal cells corresponding to one pixel row selected from a pixel group including n pixel rows are charged with corresponding pixel data of the row, and liquid crystal cells corresponding to another pixel rows maintain a voltage of a previous frame. It is assumed that the frame charge-maintaining steps include a first frame charge-maintaining step M1' and a second frame charge-maintaining step M2'. In the first frame charge-maintaining step M1', liquid crystal cells corresponding to a first pixel row I1 is charged with a corresponding pixel data of the row, and liquid crystal cells corresponding to a second pixel row I2 maintain a charged voltages of a previous frame. Similarly, the third, the fifth, the seventh, the ninth and the eleventh pixel rows I3, I5, I7, I9 and I11 charge corresponding pixel data of the row, respectively, and the fourth, the sixth, the eighth, the tenth and the twelfth pixel rows I4, I6, I8, I10 and I12 maintain each charged voltage of the previous frame.

In the second frame maintaining-charging step M2', the first, the third, the fifth, the seventh, the ninth and the eleventh pixel rows I3, I5, I7, I9 and I11 maintain a charged voltage, and the second, the fourth, the sixth, the eighth, the tenth and the twelfth pixel rows I2, I4, I6, I8, I10 and I12 are charged with voltages corresponding to each pixel data of the row of the present frame.

In the frame maintaining step S1, a voltage charged into liquid crystal cells of all pixel rows I1, I2, I3, . . . , I10, I11 and I12 is maintained. The frame charge-maintaining steps M1' and M2' are progressed during a half of a standard charging time (t/2) of the liquid crystal cells, respectively. The frame maintaining step S1 is progressed during a standard charging time (t) of the liquid crystal cells. In the frame charge-maintaining steps M1' and M2', a difference between a charging start time of the first pixel row and a charging start time of the last pixel row may be a half of a standard charging time (t/2) of the liquid crystal cells.

The present exemplary embodiment is substantially identical to the exemplary embodiment of FIG. 10 except for at least the frame charge-maintaining step M1' and M2'. In the present exemplary embodiment, all liquid crystal cells maintain a charged state corresponding to the image of the present frame during the frame maintaining step S1. A period having a charged state may be extended in comparison with other exemplary embodiment. Thus, the backlight can be turned on simultaneously while maintaining a sufficient luminance of the display.

Moreover, according to the present exemplary embodiment, since all pixel rows are not simultaneously charged, a difference between a charging start time of an even-numbered pixel row and a charging start time of an odd numbered pixel row is not generated in a process that it go through frame by frame at the same pixel row.

Figure 17:
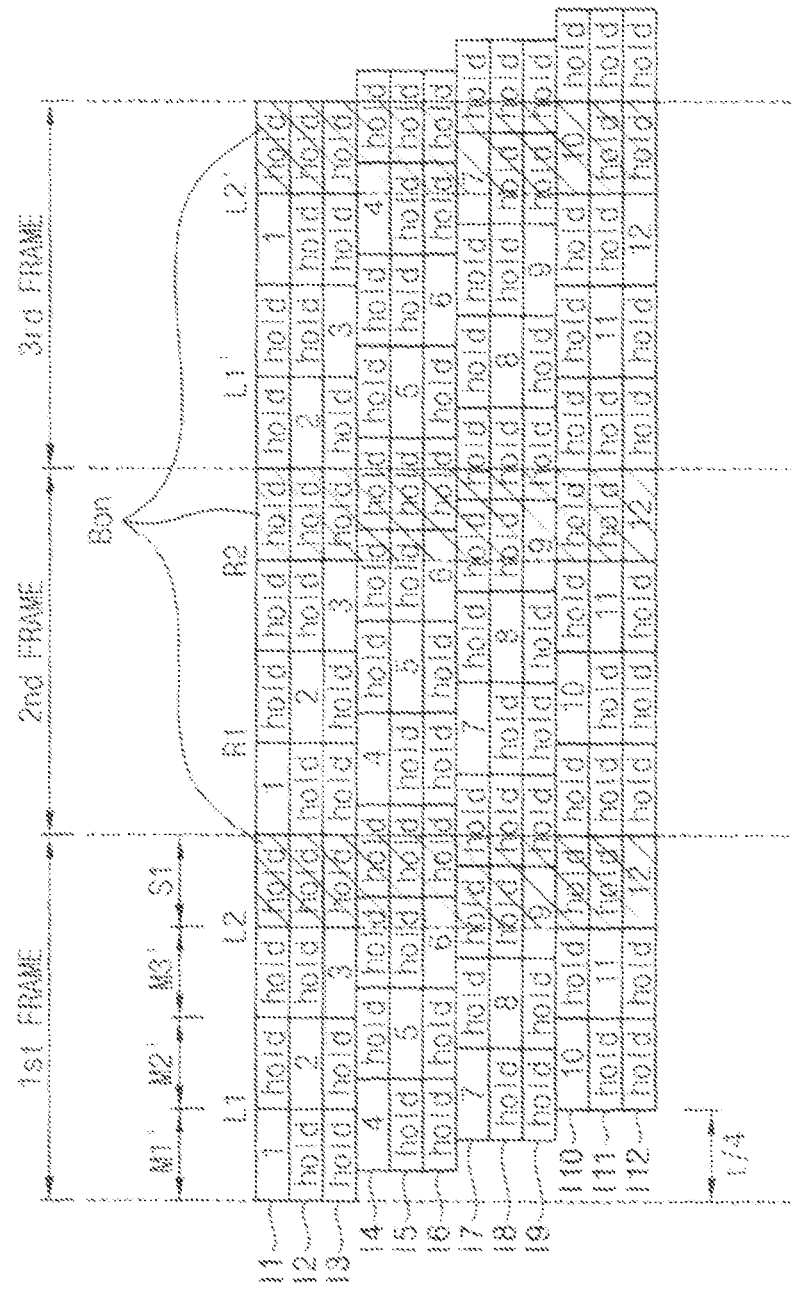
FIG. 17 is a concept diagram schematically showing a driving method of a display device according to another exemplary embodiment of the present invention.

FIG. 17 is a concept diagram schematically showing a driving method of a display device according to another exemplary embodiment of the present invention.

The exemplary embodiment of FIG. 17 is substantially the same as the exemplary embodiment of FIG. 16 except that one pixel group includes three pixel rows. Thus, any repetitive detailed description may hereinafter be omitted.

Referring to FIG. 17, in the frame charge-maintaining steps M1', M2' and M3', liquid crystal cells corresponding to one pixel row selected from a pixel group including three pixel rows is charged with corresponding pixel data, and liquid crystal cells corresponding to the other pixel rows maintain data of the previous frame. It is assumed that the frame charge-maintaining steps include a first frame charge-maintaining step M1', a second frame charge-maintaining step M2' and a third frame charge-maintaining step M3'. In the first frame charge-maintaining step M1', liquid crystal cells corresponding to a first pixel row I1 is charged with a corresponding pixel data of the present frame, and liquid crystal cells corresponding to the second and third pixel rows I2 and I3 maintain a charged pixel data of a previous frame. Similarly, the fourth, seventh and tenth pixel rows I4, I7 and I10 is charged with corresponding pixel data of the present frame, respectively, and the fifth, sixth, eighth, ninth, eleventh and twelfth pixel rows I5, I6, I8, I9, I11 and I12 maintain charged pixel data of the previous frame, respectively.

In the second frame charge-maintaining step M2', the first, the fourth, the seventh and the tenth pixel rows I1, I4, I7 and I10 which are charged with pixel data during the first frame charge-maintaining step M1' and the third, the sixth, the ninth and the eleventh pixel rows I3, I6, I9 and I12 which are charged with pixel data of a previous frame maintain a charged pixel data, and the second, the fifth, the eighth and the eleventh pixel rows I2, I5, I8 and I11 are charged with pixel data corresponding to each pixel data of the present frame.

In the third frame charge-maintaining step M3', the second, the fifth, the eighth and the eleventh pixel rows I2, I5, I8 and I11 and the first, the fourth, the seventh and the tenth pixel rows I1, I4, I7 and I10 maintain pixel data, and the third, the sixth, the ninth and the twelfth pixel rows I3, I6, I9 and I12 are charged with pixel data corresponding to each pixel data of the present frame.

In the frame maintaining step S1, pixel data charged into liquid crystal cells of all pixel rows I1, I2, I3, . . . , I11 and I12 is maintained. The frame charge-maintaining steps M1', M2' and M3' are progressed during a quarter of a standard charging time (t/4) of the liquid crystal cells, respectively, and the frame maintaining step S1 is progressed during a quarter of the standard charging time (T/4) of the liquid crystal cells. In the frame charge-maintaining steps M', M2' and M3', a difference between a charging start time of the first pixel row and a charging start time of the last pixel row may be a quarter of the standard charging time (t/4) of the liquid crystal cells.

The present exemplary embodiment is substantially identical to the exemplary embodiment of FIG. 12 except for at least the frame charge-maintaining step M1', M2' and M3'. In the present exemplary embodiment, all liquid crystal cells maintain a charged state corresponding to the image during the frame maintaining step S1. A period having a charged state may be extended in comparison with other exemplary embodiment. Thus, the backlight can be turned on simultaneously while maintaining a sufficient luminance of the display.

Moreover, in the exemplary embodiment of FIG. 12, all pixel rows are charged at the first preliminary frame charging step of one frame. However, in the present exemplary embodiment, since a portion of pixel rows is charged and the remaining of pixel rows maintain pixel data of the previous frame, a corresponding pixel data is sequentially charged into each of the pixel rows.

Figure 18:
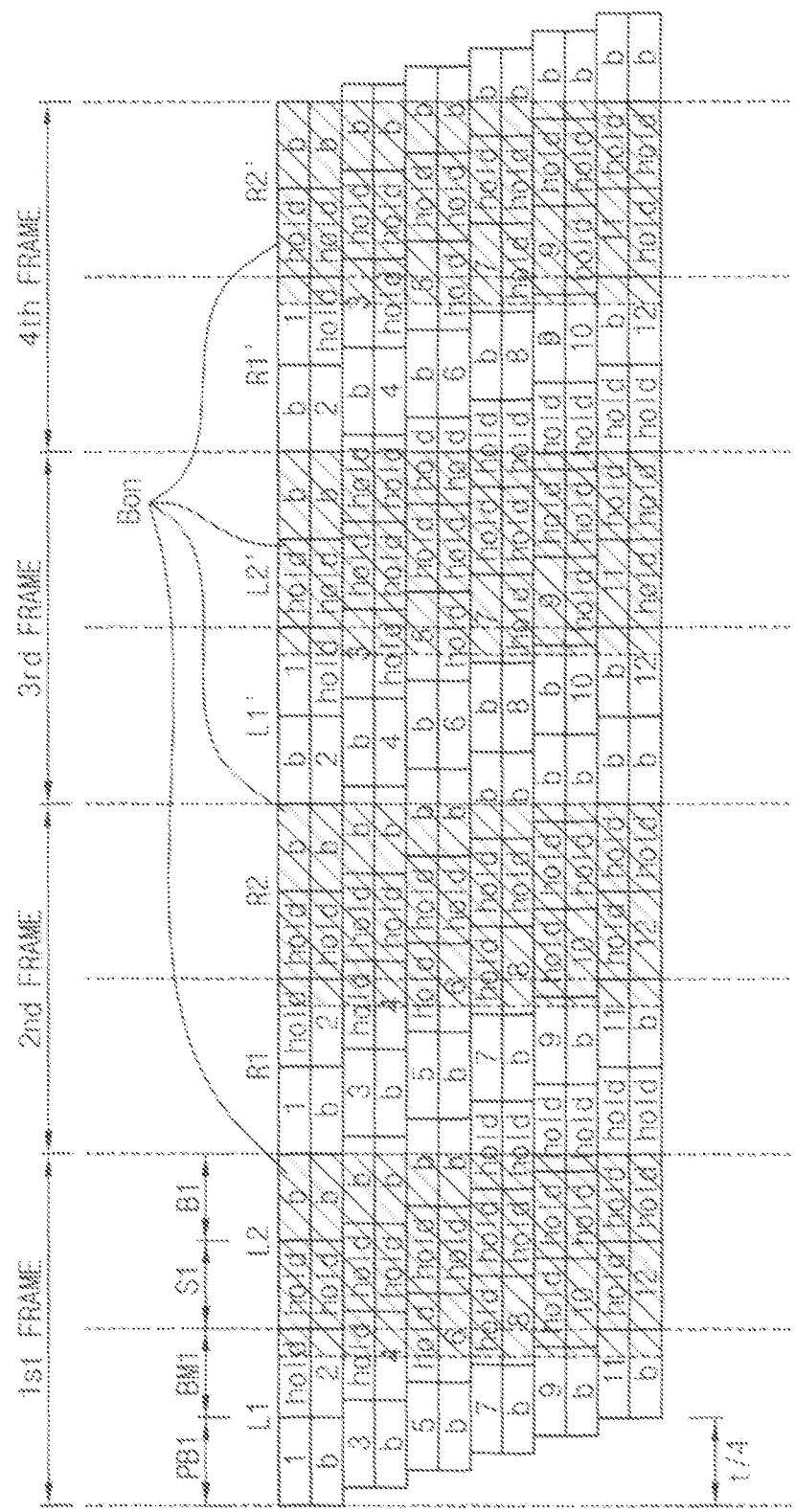
FIG. 18 is a concept diagram schematically showing a driving method of a display device according to another exemplary embodiment of the present invention.

FIG. 18 is a concept diagram schematically showing a driving method of a display device according to another exemplary embodiment of the present invention.

Referring to FIG. 18, a driving method of a display device includes frame black-charge-maintaining steps PB1 and BM1, a frame maintaining step S1 and a black image step B1.

The frame black-charge-maintaining steps PB1 and BM1 may include a first black-charge-maintaining step PR1 and a second black-charge-maintaining step BM1. In the first black-charge-maintaining step PB1, pixel data corresponding to one pixel row is charged into the pixel row of a pixel group, for example, first, third, fifth, seventh, ninth and eleventh pixel rows I1, I3, I5, I7, I9 and I11, and a voltage corresponding to a black image is charged into the other pixel rows of the pixel group, for example, second, fourth, sixth, eighth, tenth and twelfth pixel rows I2, I4, I6, I8, I10 and I12.

In the second black-charge-maintaining step BM1, a pixel row charged in the first black-charge-maintaining step PB1 maintains a charged pixel data, and a pixel row charged with a black image is charged with a pixel data of the present frame corresponding to each pixel row. That is, the first, the third, the fifth, the seventh, the ninth and the eleventh pixel rows I1, I3, I5, I7, I9 and I11 maintain a charged voltage, and the second, the fourth, the sixth, the eighth, the tenth and the twelfth pixel rows I2, I4, I6, I8, I10 and I12 are charged with a pixel data of the present frame corresponding to each pixel row.

In the frame maintaining step S1, a voltage charged into liquid crystal cells of all pixel rows I1, I2, I3, . . . , I10, I11 and I12 is maintained. Further, in the black image step B1, a voltage corresponding to a black image is charged into liquid crystal cells of all pixel rows I1, I2, I3, . . . , I10, I11 and I12. The frame black-charge-maintaining steps PB1 and BM1 are progressed during a quarter of a standard charging time (t/4) of each of the liquid crystal cell, and the frame maintaining step S1 is progressed during a quarter of a standard charging time (t/4) of each of the liquid crystal cell. In the frame black-charge-maintaining steps PB1 and BM1, a difference between a charging start time of the first pixel row and a charging start time of the last pixel row may be a quarter of a standard charging time (t/4) of the liquid crystal cells.

Figure 19:
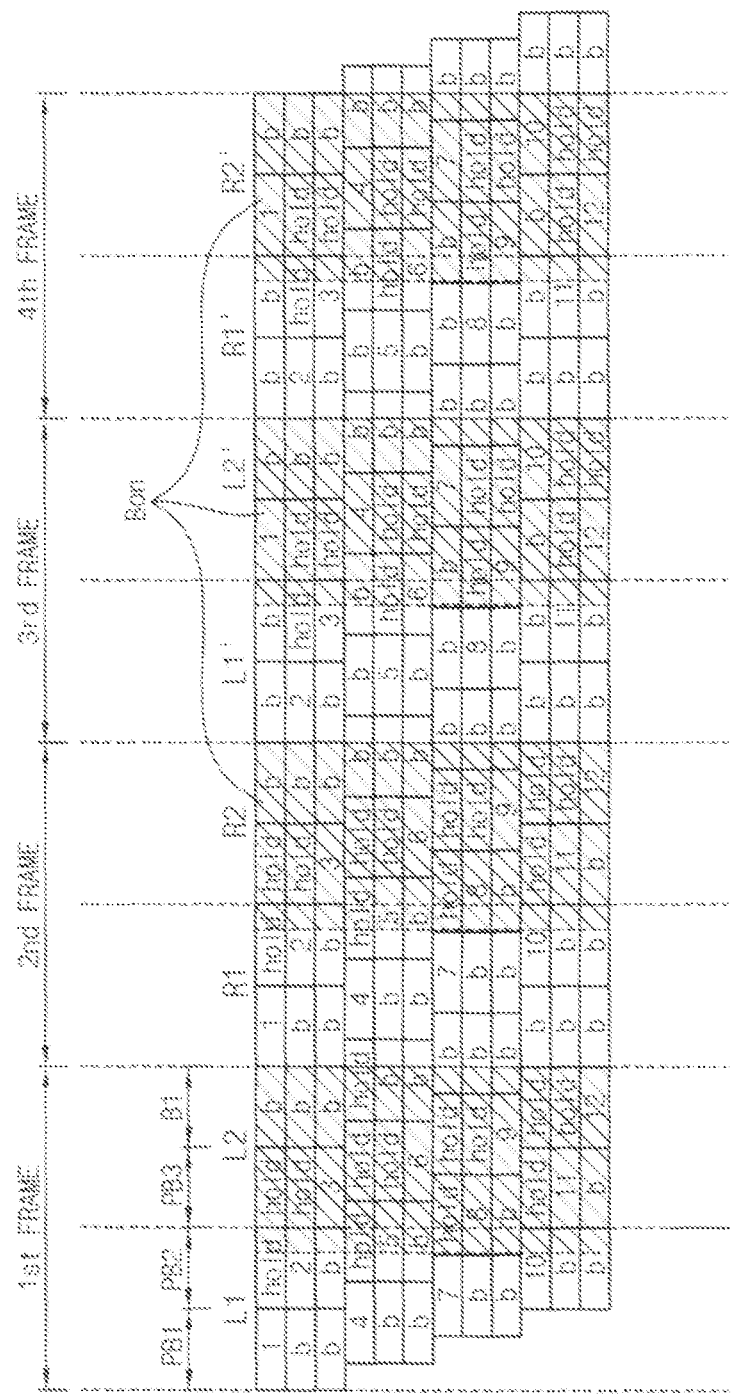
FIG. 19 is a concept diagram schematically showing a driving method of a display device according to another exemplary embodiment of the present invention.

FIG. 19 is a concept diagram schematically showing a driving method of a display device according to another exemplary embodiment of the present invention.

The exemplary embodiment of FIG. 19 is substantially the same as the exemplary embodiment of FIG. 18 except that one pixel group includes three pixel rows. Thus, any repetitive detailed description may hereinafter be omitted.

Referring to FIG. 19, a driving method of a display device includes black-charge-maintaining steps PB1, PB2 and PB3 and a black image step B1. In the black-charge-maintaining steps PB1, PB2 and PB3, liquid crystal cells of one pixel row selected from a pixel group including n pixel rows are charged with corresponding pixel data of the present frame, and liquid crystal cells in the other pixel rows are charged with pixel data corresponding to a black image. In the present exemplary embodiment, one pixel group includes three pixel rows.

For example, the black-charge-maintaining steps may include a first black-charge-maintaining step PB1, a second black-charge-maintaining step PB2 and a third black-charge-maintaining step PB3. In the first black-charge-maintaining step PB1, liquid crystal cells of one pixel, that is, first, fourth, seventh and tenth pixel rows I1, I4, I7 and I10 are charged with pixel data of the present frame, liquid crystal cells of the other pixel rows, that is, second, third, fifth, sixth, eighth, ninth, eleventh and twelfth pixel rows I2, I3, I5, I6, I8, I9, I11 and I12 are charged with a pixel data corresponding to a black image.

In the second black-charge-maintaining step PB2, a pixel row charged with a voltage of the present frame in the first black-charge-maintaining step PB1 maintains the charged voltage, and one of pixel rows charged with a black image is charged with a pixel data of the present frame corresponding to each pixel row. Liquid crystal cells charged with a voltage corresponding to a black image in the first black-charge-maintaining step PB1 are charged with a voltage corresponding to the black image again, or maintain the charged voltage. That is, the first, fourth, seventh and tenth pixel rows I1, I4, I7 and I10 may maintain the charged voltage, the second, fifth, eighth and eleventh pixel rows I2, I5, I8 and I11 may charge pixel data corresponding to pixel row, and the third, sixth, ninth and twelfth pixel rows I3, I6, I9 and I12 may be charged with pixel data corresponding to a black image or maintain a charged state of the black image.

In the black image step B1, a voltage corresponding to a black image is charged into liquid crystal cells of all pixel rows I1, I2, I3, . . . , I10, I11 and I12. The frame black-charge-maintaining steps PB1, PB2 and PB3 are progressed during a quarter of a standard charging time (t/4) of each of the liquid crystal cell, and the black image step B1 is progressed during a quarter of a standard charging time (t/4) of each of the liquid crystal cell. In the frame black-charge-maintaining steps PB1, PB2 and PB3, a difference between a charging start time of the first pixel row and a charging start time of the last pixel row may be a quarter of a standard charging time (t/4) of the liquid crystal cells.

Exemplary embodiments of the present invention of FIGS. 18 and 19 further include a black image step. Pixel data of the black image are charged in the pixels prior to and after charging pixel data of the present frame. The black image may be inserted between images of each frame so that the quality of images may be improved.

Figure 20:
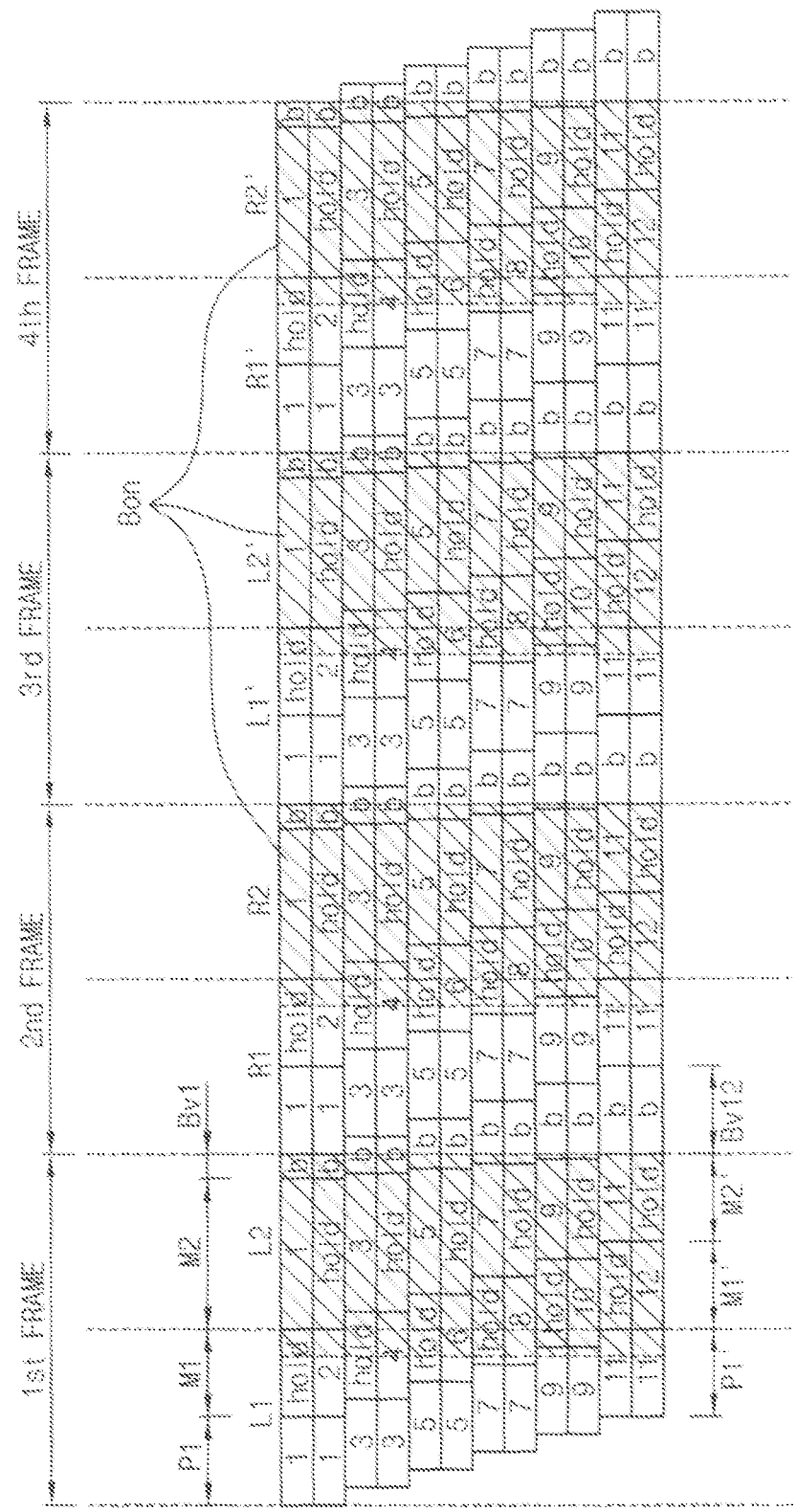
FIG. 20 is a concept diagram schematically showing a driving method of a display device according to another exemplary embodiment of the present invention.

FIG. 20 is a concept diagram schematically showing a driving method of a display device according to another exemplary embodiment of the present invention.

Referring to FIG. 20, a driving method of a display device includes a preliminary frame charging step P1, main frame charging steps M1 and M2 and a black image step Bv1. In FIG. 20, for convenience of description, it is assumed that display device has twelve pixel rows. In the present exemplary embodiment, display device may have more than one thousand pixel rows. In order to realize a high quality image display, display device may include pixel rows more than one thousand pixel rows.

Particularly, a driving method of a display device in accordance with the present exemplary embodiment of FIG. 20 is substantially the same as the driving method of a display device in accordance with the exemplary embodiment of FIG. 10 except that it includes the black image step Bv1. Thus, any repetitive detailed description may hereinafter be omitted.

In the first preliminary frame charging step P1, pixel data corresponding to a (2N−1)-th pixel row are simultaneously charged into liquid crystal cells corresponding to the (2N−1)-th pixel row and the (2N)-th pixel row. A pixel data corresponding to the first pixel row I1 is simultaneously charged into liquid crystal cells corresponding to a first pixel row I1 and a second pixel row I2, and pixel data corresponding to the third pixel row I3 is simultaneously charged into liquid crystal cells corresponding to a third pixel row I3 and a fourth pixel row I4. Similarly, fifth and sixth pixel rows I5 and I6 are charged with data corresponding to a fifth pixel row, and seventh and eighth pixel rows I7 and I8 are charged with data corresponding to a seventh pixel row. Further, ninth and tenth pixel rows I9 and I10 are charged with data corresponding to a ninth pixel row, and eleventh and twelfth pixel rows I11 and I12 are charged with data corresponding to an eleventh pixel row I12.

In the main frame charging step M1, a voltage of liquid crystal cells corresponding to the (2N−1)-th pixel row is maintained, and a pixel data corresponding to the (2N)-th pixel row is charged into liquid crystal cells corresponding to the (2N)-th pixel row. In the main frame charging step M1, a charging status of liquid crystal cells of the rows I1, I3, I5, I7, I9 and I11 is maintained. In the main frame charging step M1, liquid crystal cells corresponding to the second pixel row I2 is charged with data corresponding to the second pixel row I2, and liquid crystal cells corresponding to the fourth pixel row I4, the sixth row I6, the eighth pixel row I8, the tenth pixel row I10 and the twelfth pixel row I12 are charged with data corresponding to a data lines, respectively.

In the black image step Bv1, a voltage corresponding to a black image is charged into liquid crystal cells of all pixel rows I1, I2, I3, . . . , I10, I11 and I12. In the black image step Bv1, a duration of the first pixel row and a duration of the last pixel row on a display device may be set different from each other. For example, the black image step Bv1 of the first pixel row may be below an average duration, and the black image step Bv12 of the last pixel row may be over the average duration. Further, a duration of the black image step Bv1 may be set to have the maximum duration at the last pixel row by being gradually increased from the first pixel row.

Referring to FIG. 20, a duration of the black image step Bv1 at the first pixel row is gradually increased, so that a continue time of the black image step Bv12 is the maximum at the last pixel row.

FIG. 21 is a concept diagram schematically showing a driving method of a display device according to another exemplary embodiment of the present invention.

Referring to FIG. 21, a driving method of a display device includes a preliminary frame charging step P1, a main frame charging step M1, a frame maintaining step S1 and a black image step Bv1. In FIG. 21, for convenience of description, it is assumed that display device has twelve pixel rows. In the present exemplary embodiment, display device may have more than one thousand pixel rows. In order to realize a high quality image display, display device may include pixel rows more than one thousand pixel rows.

Particularly, a driving method of a display device in accordance with the present exemplary embodiment of FIG. 21 is substantially the same as the driving method of a display device in accordance with the exemplary embodiment of FIG. 20 except that a second frame charge-maintaining step M2 is replaced with a frame maintaining step S1. Thus, any repetitive detailed description may hereinafter be omitted.

In the first preliminary frame charging step P1, pixel data corresponding to a (2N−1)-th pixel row are simultaneously charged into liquid crystal cells corresponding to the (2N−1)-th pixel row and the (2N)-th pixel row. A pixel data corresponding to the first pixel row I1 is simultaneously charged into liquid crystal cells corresponding to a first pixel row I1 and a second pixel row I2, and pixel data corresponding to the third pixel row I3 is simultaneously charged into liquid crystal cells corresponding to a third pixel row I3 and a fourth pixel row I4. Similarly, fifth and sixth pixel rows I5 and I6 are charged with data corresponding to a fifth pixel row, and seventh and eighth pixel rows I7 and I8 are charged with data corresponding to a seventh pixel row. Further, ninth and tenth pixel rows I9 and I10 are charged with data corresponding to a ninth pixel row, and eleventh and twelfth pixel rows I11 and I12 are charged with data corresponding to an eleventh pixel row I12.

In the main frame charging step M1, a voltage of liquid crystal cells corresponding to the (2N−1)-th pixel row is maintained, and a pixel data corresponding to the (2N)-th pixel row is charged into liquid crystal cells corresponding to the (2N)-th pixel row. In the main frame charging step M1, a charging status of liquid crystal cells of the rows I1, I3, I5, I7, I9 and I11 is maintained. In the main frame charging step M1, liquid crystal cells corresponding to the second pixel row I2 is charged with data corresponding to the second pixel row I2, and liquid crystal cells corresponding to the fourth pixel row I4, the sixth row I6, the eighth pixel row I8, the tenth pixel row I10 and the twelfth pixel row I12 are charged with data corresponding to a data lines, respectively.

In the frame maintaining step S1, a voltage charged into liquid crystal cells of all pixel rows I1, I2, I3, . . . , I10, I11 and I12 is maintained. A duration of the frame maintaining step S1 may be set to have the minimum duration at the last pixel row by being gradually decreased from the first pixel row.

In the black image step Bv1, a voltage corresponding to a black image is charged into liquid crystal cells of all pixel rows I1, I2, I3, . . . , I10, I11 and I12. In the black image step Bv1, a duration of the first pixel row and a duration of the last pixel row on a display device may be set different from each other. For example, the black image step Bv1 of the first pixel row may be below an average duration, and the black image step Bv12 of the last pixel row may be over the average duration. Further, a duration of the black image step Bv1 may be set to have the maximum duration at the last pixel row by being gradually increased from the first pixel row.

Referring to FIG. 21, a duration of the black image step Bv1 at the first pixel row is gradually increased, so that a continue time of the black image step Bv12 is the maximum at the last pixel row.

As described above, according to the exemplary embodiments of the present invention, at least two pixel rows are simultaneously charged to decrease a delay time of pixel row to a half or a quarter of a standard charging time of liquid crystals, so that a 3D image may be displayed without decreasing of a vertical resolution.

Moreover, an effective charging interval that a charging of the liquid crystal cells is completed in each frame is longer than a conventional art, so that a backlight turn on time may become longer. Thus, a total luminance of a display device may be enhanced.

Moreover, an effective charging interval that a charging of the liquid crystal cells is completed in each frame becomes longer, so that a backlight may be turned on simultaneously while maintaining sufficient luminance of the display which reduce a manufacturing cost remarkably.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A method of driving a display device, the method comprising:
    a preliminary frame charging step of simultaneously charging liquid crystal cells in a pixel line group having a first pixel row and a second pixel row with pixel data corresponding to pixel data of the first pixel row; and
    a main frame charging step of charging liquid crystal cells in the second pixel row with pixel data corresponding to the second pixel row,
    wherein a backlight is turned on during the main frame charging step.

2. The method of claim 1, wherein the pixel line group has n pixel lines and the main frame charging step is repeated (n−1) times during one frame, wherein n is natural numbers greater than 2.

3. The method of claim 2, wherein the preliminary frame charging step and the main frame charging step are performed during a time shorter than 1/n of a standard charging time of the liquid crystal cells.

4. The method of claim 1, in the preliminary frame charging step and the main frame charging step, wherein a difference between a charging start time of a first pixel line and a charging start time of a last pixel line is a half of a standard charging time of the liquid crystal cells.

5. The method of claim 1, wherein the preliminary frame charging step and the main frame charging step are performed for a standard charging time of the liquid crystal cells.

6. The method of claim 5, wherein, when a backlight unit is sequentially driven corresponding to pixel rows, the backlight unit is turned on after a half of a standard charging time of the liquid crystal cell is elapsed from a beginning of the preliminary frame charging step and is turned off before an ending of the main frame charging step.

7. The method of claim 5, wherein, when the backlight unit is simultaneously turned on, the backlight unit is turned on after beginning of a preliminary frame charging step of the first pixel line and before ending of a main frame maintaining step of the first pixel line.

8. The method of claim 1, wherein the preliminary frame charging step and the main frame charging step are performed for a half of a standard charging time of the liquid crystal cells.

9. The method of claim 8, wherein when a backlight unit is sequentially driven corresponding to pixel rows, the backlight unit is turned on after a beginning of the main charging step and is turned off before an ending of the main frame charging step.

10. The method of claim 8, further comprising:
    a frame maintaining step of maintaining pixel data of liquid crystal cells of all pixel rows.

11. The method of claim 10, wherein the frame maintaining step is performed for the standard charging time of the liquid crystal cells.

12. The method of claim 11, wherein when the backlight unit is turned on simultaneously, the backlight unit is turned on after an ending a main frame charging step of the last pixel line and before an ending of a frame maintaining step of the first pixel line.

13. The method of claim 10, further comprising:
a black image step of charging a voltage corresponding to a black image into liquid crystal cells of all pixel rows.

14. The method of claim 13, wherein the frame maintaining step and the black image step are performed for a half of the standard charging time of each liquid crystal cells.

15. The method of claim 13, wherein the duration of the black image step is set to have a maximum duration at the last pixel line by being gradually increased from the first pixel row.

16. The method of claim 1, further comprising:
a reversion preliminary frame charging step of simultaneously charging pixel data in the first pixel row and the second pixel row with pixel data corresponding to the second pixel row after the preliminary charging step and the main frame charging step; and
a reversion main frame charging step of maintaining voltages of liquid crystal cells of the second pixel row and simultaneously charging a pixel data in the first pixel row with pixel data corresponding to the first pixel row.

17. The method of claim 16,
wherein images of the preliminary frame charging step, the main frame charging step, the reversion preliminary frame charging step and the reversion main frame charging step are right-eye images, and the method further comprises:
a preliminary frame charging step of simultaneously charging the liquid crystal cells in the pixel line group of the first pixel row and the second pixel row with left-eye pixel data corresponding to the first pixel row; and
a main frame charging step of charging the liquid crystal cells in the second pixel row with left-eye pixel data corresponding to the second pixel row.

18. The method of claim 16, wherein left-eye images and right-eye images are alternatingly displayed on a display device.

19. The method of claim 1, further comprising:
a frame maintaining step of maintaining a voltage of liquid crystal cells of all pixel rows.

20. The method of claim 19, wherein the main frame charging step and the frame main maintaining step is substantially equal to a standard charging time of the liquid crystal cells.

21. The method of claim 19, wherein the preliminary frame charging step comprises:
a first preliminary frame charging step of simultaneously charging a pixel data of a first representative pixel line among a (3N−2)-th pixel line, a (3N−1)-th pixel line and a 3N-th pixel line into liquid crystal cells corresponding to the (3N−2)-th pixel line, the (3N−1)-th pixel line and the 3N-th pixel line, respectively; and
a second preliminary frame charging step of maintaining a voltage of liquid crystal cells corresponding to the first representative pixel line, of selecting a second representative line of pixel lines except the first representative pixel line from the (3N−2)-th pixel line, the (3N−1)-th pixel line and the 3N-th pixel line, and of simultaneously charging a pixel data of the second representative pixel line into liquid crystal cells corresponding to remaining two pixel lines.

22. The method of claim 21, in the first and second preliminary frame charging steps, the main frame charging step and the frame maintaining step, wherein a difference between a charging start time of a first pixel line and a charging start time of a last pixel line or a difference between a maintaining start time of the first pixel line and a maintaining start time of the last pixel line is a quarter of the standard charging time of the liquid crystal cells.

23. The method of claim 21, wherein the first preliminary frame charging step and the second preliminary frame charging step, the main frame charging step and the frame maintaining step are performed for a quarter of the standard charging time of the liquid crystal cells.

24. The method of claim 21, wherein the first preliminary frame charging step and the second preliminary frame charging step, the main frame charging step and the frame maintaining step are performed for equal to or more than about ⅓ of the standard charging time of the liquid crystal cells.

25. The method of claim 19, in the preliminary frame charging step, the main frame charging step and the frame maintaining step, wherein a difference between a charging start time of a first pixel line and a charging start time of the last pixel line or a difference between a maintaining start time of a first pixel line and a maintaining start time of the last pixel line is a quarter of the standard charging time of the liquid crystal cells.

26. The method of claim 25, wherein the preliminary frame charging step and the main frame charging step are performed during a quarter of the standard charging time of the liquid crystal cells, and
the frame maintaining step is performed during a half of the standard charging time of the liquid crystal cells.

27. A method of driving a display device, the method comprising:
a preliminary frame charging step of simultaneously charging liquid crystal cells in a pixel line group of a first pixel row and a second pixel row with pixel data of the first pixel row;
a main frame charging step of charging liquid crystal cells in the second pixel row with pixel data corresponding to the second pixel row;
a frame maintaining step of maintaining pixel data of liquid crystal cells of all pixel rows; and
a black image step of charging a voltage corresponding to a black image into liquid crystal cells of all pixel rows,
wherein the preliminary frame charging step and the main frame charging step are performed for a half of a standard charging time of the liquid crystal cells,
wherein, in the black image step, a duration of the black image step corresponding to a first pixel line on a display device is shorter than that of the black image step corresponding to a last pixel line on the display device, and
wherein a backlight is turned on during the main frame charging step.

* * * * *